(12) United States Patent
Suzuki

(10) Patent No.: US 6,359,649 B1
(45) Date of Patent: *Mar. 19, 2002

(54) VIDEO CAMERA INTEGRATED WITH STILL CAMERA

(75) Inventor: Etsurou Suzuki, Kanagawa-ken (JP)

(73) Assignee: Canon Kabushiki Kaisa, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/625,548

(22) Filed: Apr. 1, 1996

(30) Foreign Application Priority Data

| Apr. 4, 1995 | (JP) | ............................................. 7-078794 |
| Jun. 14, 1995 | (JP) | ............................................. 7-147650 |

(51) Int. Cl.$^7$ ............................................. H04N 5/225
(52) U.S. Cl. ................................. 348/220; 348/333.11
(58) Field of Search ................................. 348/220, 333, 348/372, 371, 370, 334, 373, 375, 64, 315; 358/906, 909.1; 396/374, 429; H04N 5/232

(56) References Cited

U.S. PATENT DOCUMENTS

| 4,829,384 A | * | 5/1989 | Iida et al. ..................... 358/229 |
| 4,841,359 A | * | 6/1989 | Hawkins et al. ............... 358/76 |
| 5,387,928 A | * | 2/1995 | Nishimura .................... 348/70 |
| 5,416,560 A | * | 5/1995 | Taka ......................... 354/471 |
| 5,453,796 A | * | 9/1995 | Duffield et al. ............. 348/565 |
| 5,497,193 A | * | 3/1996 | Mitsuhashi et al. .......... 348/231 |
| 5,546,121 A | * | 8/1996 | Gotanda et al. .............. 348/64 |
| 5,734,424 A | * | 3/1998 | Sasaki ........................ 348/220 |
| 5,883,666 A | * | 3/1999 | Kyuma et al. ............... 348/220 |
| 5,899,581 A | * | 5/1999 | Kawamura et al. ......... 348/220 |
| 5,923,816 A | * | 7/1999 | Ueda .......................... 348/220 |
| 5,956,082 A | * | 9/1999 | Yamazaki .................... 348/222 |
| 6,037,972 A | * | 3/2000 | Horiuchi et al. .............. 348/64 |
| 6,069,994 A | * | 5/2000 | Kozuki et al. .............. 348/220 |
| 6,130,710 A | * | 10/2000 | Yasuda ........................ 348/220 |

FOREIGN PATENT DOCUMENTS

| JP | 5-110947 | * | 4/1993 | .......... H04N/5/278 |

* cited by examiner

Primary Examiner—Wendy R. Garber
Assistant Examiner—Jacqueline Wilson
(74) Attorney, Agent, or Firm—Robin, Blecker & Daley

(57) ABSTRACT

In a video camera integrated with a still camera in which the still camera and the video camera are integrated into one camera body, while photography is not being performed by the video camera, an image immediately preceding an image to be recorded by the still camera and an image immediately following the image recorded by the still camera can be displayed on a monitor of the video camera. While photography is being performed by the video camera, the display of images before and after the execution of photography by the still camera is inhibited. When the camera is equipped with a flash device and still camera recording is accompanied by a flash emission, control is effected such that image information is stored for one field which is recorded by the video camera and which does not include image information for one field which does not contain an emission of the flash device is displayed. Alternatively, during flashing, an exposure value of the video camera may be made approximately equal to a correct exposure value that allows the still camera to achieve a correct exposure during flashing and display is made of a stored field which contains the emission of the flash device.

24 Claims, 17 Drawing Sheets

F I G. 14
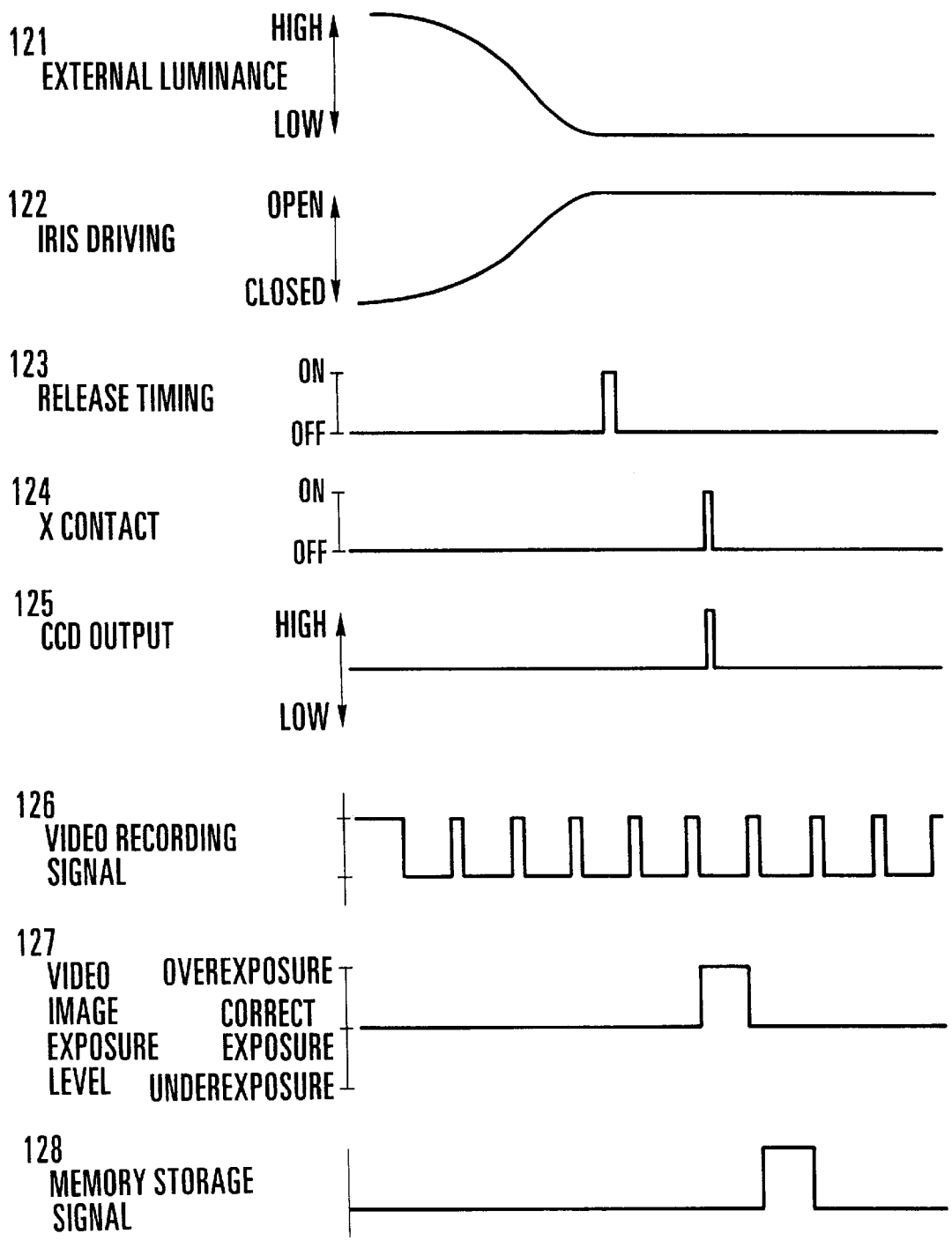

VIDEO CAMERA INTEGRATED WITH STILL CAMERA

BACKGROUND OF THE INVENTION

1. Field of the Invention

The present invention relates to a video camera integrated with a still camera, which includes video camera means for photographing and recording a moving image and still camera means for photographing and recording a still image.

2. Description of the Related Art

In some events such as athletics meets or student theatricals and concerts, photographers may feel that if they had a still camera for recording a still image on silver-halide film or the like, they could take a photograph of a scene which they are photographing by using a video camera for recording a moving image on a recording medium such as magnetic tape. During trips or the like, some photographers may also feel tired of carrying both a video camera and a still camera with them.

To cope with these problems, it has been proposed to provide various types of video cameras integrated with still cameras in any of which a video camera and a still camera are integrated into one camera.

For example, U.S. Pat. No. 3,546,375 discloses an arrangement in which a movable mirror is disposed in the optical path of a photographing objective lens so that the position of the movable mirror can be selectively switched so as to record a still image and a moving image on different recording media, respectively.

As another example, Japanese Laid-Open Utility Model Application No. Sho 57-96444 discloses an arrangement in which an optical image pickup part for making a photographic recording on silver-halide film is integrally provided on a video camera body or is removably provided thereon as a separate part. As yet another example, Japanese Laid-Open Patent Application No. Hei 1-185533 proposes a composite camera having a confirmation function for providing a monitoring display of an image signal which corresponds to an image formed on silver-halide film and is supplied from a photoelectric conversion type of image pickup element.

However, none of the aforesaid conventional examples has succeeded in offering a satisfactory solution which makes it possible to prevent the complexity of operability from increasing owing to the integration of two such separate devices, one for handling a moving image and the other for handling a still image. According to any of the conventional examples, users cannot readily enjoy the desired photography.

As is known, if an image is displayed by using an image pickup element for photographing a moving image, a signal processing circuit and the like, it is possible to realize a so-called pre- or post-confirmation display which allows a user to confirm the state of a still image to be recorded, before or after the still image is recorded.

The electronic camera described in Japanese Laid-Open Utility Model Application No. Sho 61-251381 is provided with a solid-state image pickup element on which to form a subject image through an optical system, and an optical display device for electro-optically displaying an image formed on the solid-state image pickup element, the optical display device being disposed so that the image can be visually confirmed within a viewfinder. This arrangement has the advantage that since a user, before photography, can confirm a content to be photographed, he/she can prevent a failure in photography.

On the other hand, if the user is to perform a pre- or post-confirmation during the use of such a video camera integrated with a still camera, which can effect both still-image photography and moving-image photography in one camera body, the user will encounter the following problems.

If the user performs a pre- or post-confirmation of a still image during photography of a moving image, the user will not be able to monitor the photographic state of the moving image, because the moving image is not displayed when the still image is displayed. Specifically, it is necessary to display the still image for a sufficiently long time so that the user can perform a satisfactory pre- or post-confirmation of the photographic state of the still image. However, the longer the display time of the still image, the longer the time period during which the user cannot monitor the photographic state of the moving image, so that an image shake or an unintended composition will be produced.

Such apparatus is generally provided with display means of limited size which utilizes a liquid crystal display plate, a Braun tube or the like which is inferior in resolution to a photographic print or the like. As a result, if moving-image information and still-image information used for a pre- or post-confirmation are displayed on one image display means at the same time, particularly if still-image information is displayed in a small area, the user will not be able to confirm the face or facial expression of a person photographed or to be photographed.

SUMMARY OF THE INVENTION

It is, therefore, an object of the present invention to provide a video camera integrated with a still camera which is capable of solving the above-described problems.

Another object of the present invention is to provide a video camera integrated with a still camera which is capable of preventing inconveniences from occurring when a photographer performs a pre- or post-confirmation of a still image during recording of a moving image and which is capable of realizing both confirmation of the photographic status of a moving image and pre- and post-confirmations of a still image only by using one display means.

Another object of the present invention is to make the operabilities of still and video cameras compatible with each other.

To achieve the above objects, in accordance with one aspect of the present invention, there is provided a video camera integrated with a still camera which comprises video camera means for recording moving-image information on a first recording medium, still camera means for recording still-image information on a second recording medium, display means for displaying a moving image obtainable from the video camera means and a still image obtainable from the still camera means, control means for controlling the video camera means, the still camera means and the display means, and operating means for allowing a user to perform photographing and recording operations. The display means has a function capable of carrying out a pre-confirmation display to temporarily display an image immediately preceding an image to be recorded by the still camera means, and of carrying out a post-confirmation display to temporarily display an image recorded by the still camera means. The control means executes control so that, while the video camera means is recording a moving image, the display means does not carry out the pre-confirmation display nor the post-confirmation display and displays the moving image which is being photographed and recorded.

In accordance with another aspect of the present invention, there is provided a video camera integrated with a still camera in which the control means executes control so that, while the video camera means is recording the moving image, the display means does not carry out the pre-confirmation display nor the post-confirmation display and, after the video camera means stops its photographing and recording operations, carries out the pre-confirmation display and the post-confirmation display.

In accordance with another aspect of the present invention, there is provided a video camera integrated with a still camera which comprises video camera means, still camera means, display means for displaying a moving image obtainable from the video camera means and a still image obtainable from the still camera means, control means for controlling the video camera means, the still camera means and the display means, and operating means for allowing a user to perform photographing and recording operations. The display means has a function capable of carrying out a pre-confirmation display to temporarily display an image immediately preceding an image to be recorded by the still camera means, and of carrying out a post-confirmation display to temporarily display an image recorded by the still camera means. The control means executes control so that, when the display means is to carry out the pre-confirmation display or the post-confirmation display while an image is being recorded by the video camera means, the display means continues to display the image recorded by the video camera means in a portion of a display plane of the display means and carries out the pre-confirmation display or the post-confirmation display in another portion of the display plane which is wider than the portion in which the image recorded by the video camera means is displayed.

Another object of the present invention is to provide a video camera integrated with a still camera in which, while moving-image information is being recorded by video camera means, display means does not carry out a pre-confirmation display nor a post-confirmation display and continues to display a moving image which is being photographed and recorded, so that it is possible to prevent recording of moving-image information from being hindered.

Another object of the present invention is to provide a video camera integrated with a still camera in which, after recording of moving-image information is stopped, display means carries out a pre-confirmation display and a post-confirmation display of a recording made by still camera means, so that a confirmation of a photographed still image is enabled.

Another object of the present invention is to provide a video camera integrated with a still camera in which display means continues to display an image recorded by video camera means in a portion of a display plane of the display means and carries out a pre-confirmation display or a post-confirmation display in another portion of the display plane which is wider than the portion in which the image recorded by the video camera means is displayed, so that still camera means can readily carry out recording while the video camera means is continuing recording.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 14 is a timing chart of a post-confirmation accompanied by a flash emission according to the fourth embodiment;

DETAILED DESCRIPTION OF THE PREFERRED EMBODIMENTS

Preferred embodiments of a video camera integrated with a still camera according to the present invention will be described below in detail with reference to the accompanying drawings.

(First Embodiment)

A first embodiment of the present invention will be described below with reference to FIGS. 1 to 5.

Figure 1:
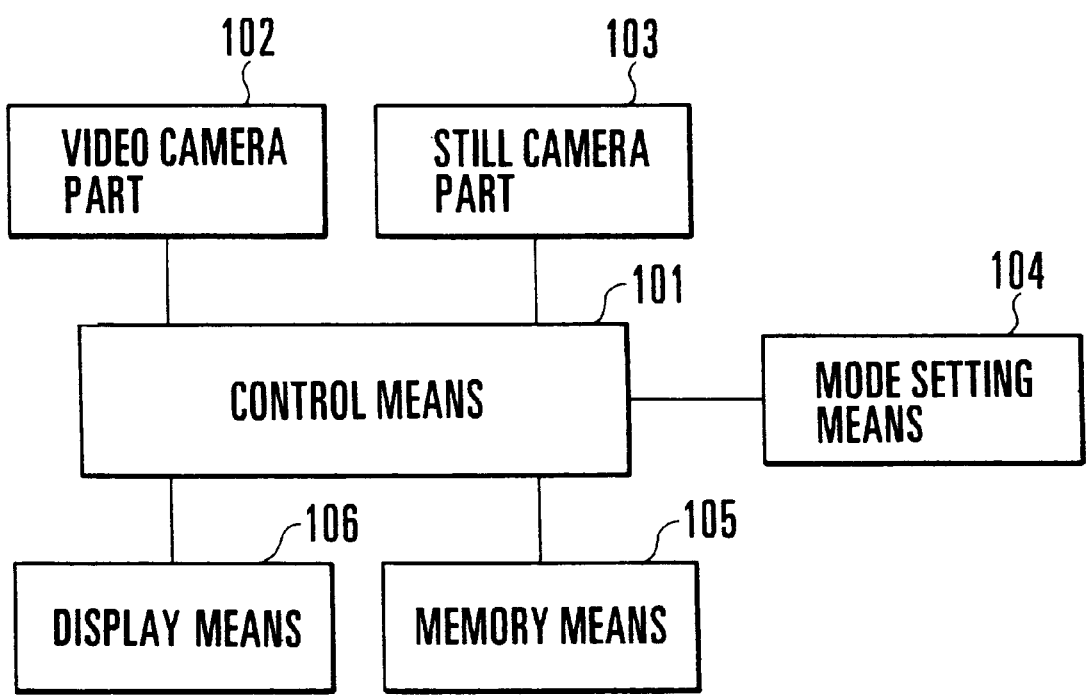
FIG. 1 is a block diagram of a first embodiment.

FIG. 1 is a block diagram of the first embodiment. A video camera integrated with a still camera according to the first embodiment has a trigger button (indicated by 34 in FIG. 3) for video-moving-image photography and a shutter button (indicated by 35 in FIG. 3) for silver-halide still-image photography.

If a pre- and post-confirmation mode is selected through mode setting means 104, when a signal indicative of a first stroke of the shutter button 35 for still-image photography is inputted to control means 101, the control means 101 causes memory means 105 to store an image signal for one field indicative of an image picked up by a video camera part 102, and displays the image for a predetermined time by using display means 106. After that, when a signal indicative of a second stroke of the shutter button 35 is inputted to the control means 101, the control means 101 executes control, such as automatic focusing control (AF) and automatic exposure control (AE), over a silver-halide still camera part 103, thereby effecting exposure of film.

At this time, the control means 101 causes the memory means 105 to again store an image signal for one field indicative of an image picked up by the video camera part 102, at the input timing of the signal indicative of the second stroke of the shutter button 35. Then, the control means 101 displays the image for a predetermined time by using the display means 106.

In this manner, it is possible to realize pre-confirmation which allows a photographer to check a photographic composition or the like before a silver-halide still photograph is taken, and post-confirmation which allows the photographer to confirm, after exposure, an image obtained at the same timing that an exposure operation is actually performed.

In a case where video-moving-image photography is being performed by the video camera part 102, even if a signal indicative of the first or second stroke of the shutter button 35 for still-image photography is inputted to the control means 101, the control means 101 does not execute the storing of the image in the memory means 105 and displays a warning to that effect on the display means 106.

The control means 101 is arranged to perform an electronic-zoom function (the function of cutting out and enlarging a part of a picked-up image and recording on video tape the image zoomed up pseudo-optically) and various kinds of special effects by using the memory means 105 if an image for pre- and post-confirmations does not need to be stored in the memory means 105.

Figure 2:
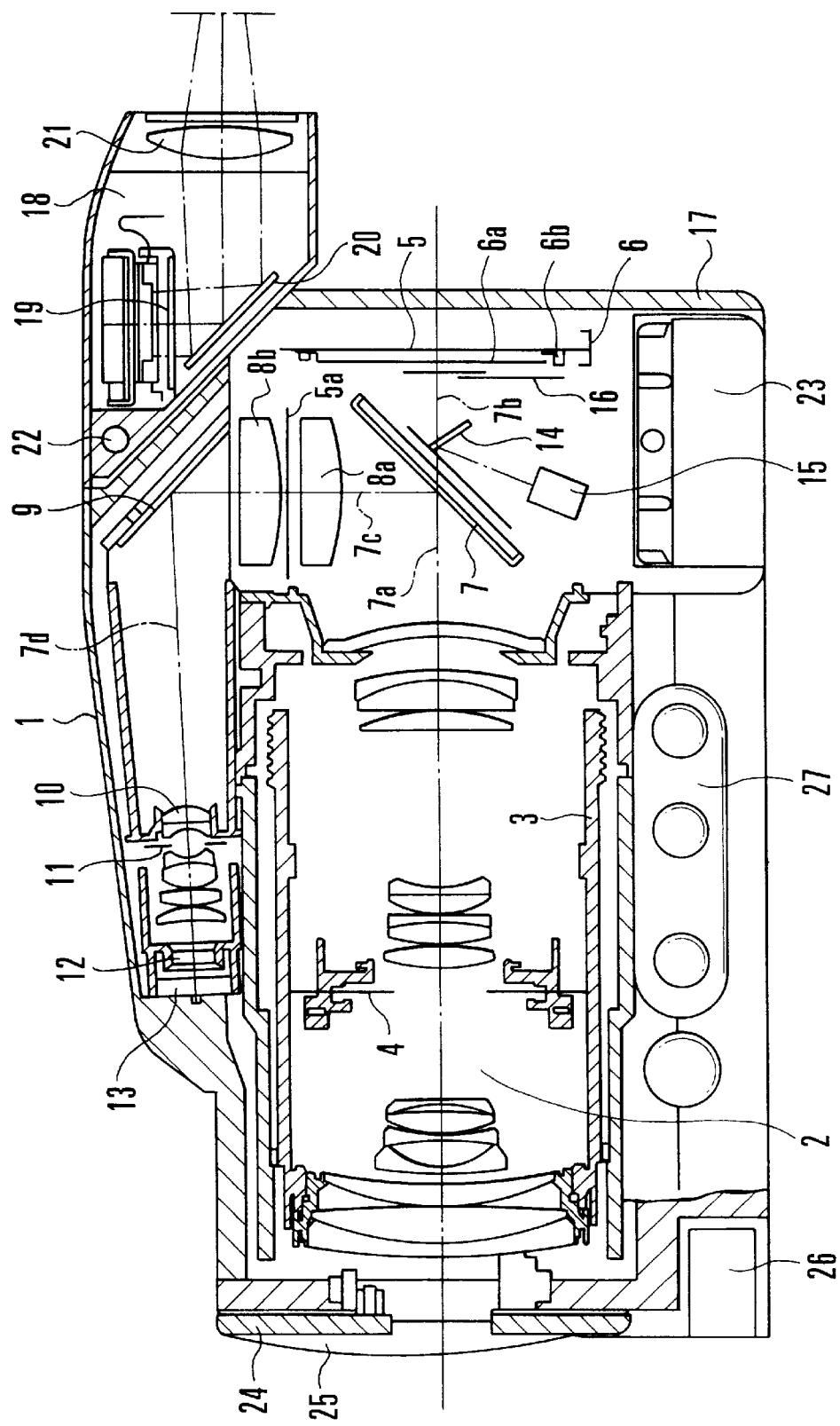
FIG. 2 is a partly cutaway, left side view of the first embodiment.

FIG. 2 is a partly cutaway, left side view aiding in describing the function of the first embodiment. The apparatus shown in FIG. 2 includes an exterior cover 1 which constitutes part of the present camera and is made up of a plurality of components joined together by fastening parts such as screws, a lens unit 2 for conducting an image onto silver-halide film 5, a lens barrel 3 for holding lens elements which constitute the lens unit 2, and an iris diaphragm 4 for silver-halide still-image photography. In the first embodiment, the lens unit 2 is a zoom lens which has a magnification-varying lens element group which can move along the optical axis in interlocking relation to an automatic or manual zooming operation, and a focusing lens element group which is driven in accordance with information supplied from an automatic focus adjusting device which will be described later.

The apparatus also includes a shutter device 6 disposed immediately before the silver-halide film 5 which is made up of a shutter curtain 6a, a shutter frame 6b and the like, and a semi-transparent thin-film mirror 7 for sending an image of a subject toward the silver-halide film 5 and a video image pickup element. In FIG. 2, reference numeral 7a denotes the optical axis of light entering from a subject side, reference numeral 7b denotes the optical axis of light which is transmitted through the semi-transparent thin-film mirror 7 toward the silver-halide film 5, and reference numerals 7c and 7d denote optical axes reflected by the semi-transparent thin-film mirror 7. The apparatus also includes field lenses 8a and 8b provided on the optical axis 7c for matching the pupil of the subject to the optical axis 7c, a reflecting mirror 9 for deflecting the photographing optical axis 7c, a reducing lens unit 10 which is provided on the optical axis 7d and contains a video iris unit 11 for video-moving-image photography, an optical low-pass filter 12, and a solid-state image pickup element 13. An aerial image 5a is formed at a position equivalent to the silver-halide film 5, and is again formed on the solid-state image pickup element 13 via the reducing lens unit 10.

A submirror 14 is disposed behind the semi-transparent thin-film mirror 7 so that it can be retracted during photography, and is arranged to guide part of photographing light to an automatic focus detecting device 15. The automatic focus detecting device 15 used in the first embodiment is of a phase-difference detecting type which has heretofore been known, and is arranged to compare a plurality of images produced by light beams passing through a plurality of different areas of a photographing lens and detect the amount and direction of defocusing on the surface of the silver-halide film 5. Since a subject image is obtained on the solid-state image pickup element 13 at all times, a defocus detecting type of automatic focus adjustment may be carried out on the basis of a high-frequency video signal obtained from the solid-state image pickup element 13, or a composite type of automatic focus adjustment in which the defocus detecting type of automatic focus adjustment is combined with the phase-difference detecting type adopted in the first embodiment may be carried out.

A light blocking plate 16 for preventing a leak of light rays due to the use of the semi-transparent thin-film mirror 7 is disposed so that it can be retracted during photography.

A back lid unit 17 is provided so that it can be opened and closed to load or unload the silver-halide film 5. Although in the first embodiment a 135 type of silver-halide film is employed, the kind of film to be used is not necessarily limited to the 135 type alone. For example, film of a drop-in type or a disk type may be adopted.

An electronic viewfinder unit 18 is arranged to output a video image to a small liquid crystal display plate 19 so that the photographer can observe the image via a reflecting mirror 20 and an eyepiece lens 21 for the purpose of monitoring a video signal supplied from the solid-state image pickup element 13. The electronic viewfinder unit 18 can be rotated about a rotating shaft 22.

In the arrangement shown in FIG. 2, the iris diaphragm 4 for silver-halide still-image photography is at all times maintained in its fully open state during video-moving-image photography, and when a release switch for silver-halide still-image photography (which will be described later) is depressed, the iris diaphragm 4 is stopped down to a predetermined diameter. Accordingly, during moving-image photography, exposure control is performed by only the video iris unit 11 provided in the reducing lens unit 10, and correct exposure is obtained by altering the storage time of the solid-state image pickup element 13 and the gain of a signal processing system, as required.

A secondary battery 23 is removably attached to a bottom portion of the present apparatus, and serves as a common single power source for supplying the required electrical power to the present apparatus. A barrier 25 in which a flash unit 24 is incorporated and which can be opened and closed is disposed in front of the lens unit 2. A microphone 26 is provided for recording sound during video photography, and an external terminal 27 is provided as an interface for connection to an external apparatus such as a television set or a stereo set.

Figure 3:
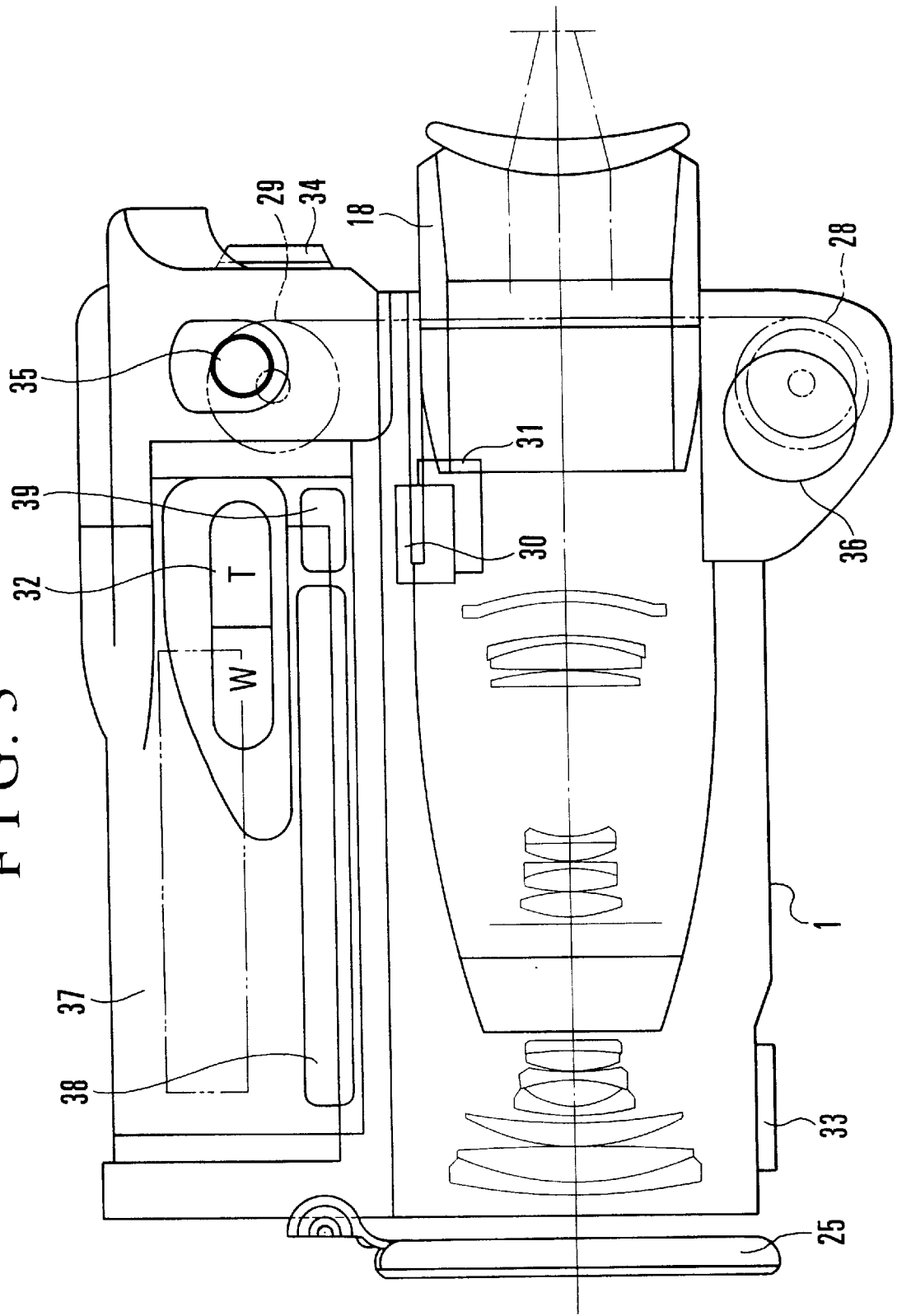
FIG. 3 is a schematic top plan view of the first embodiment.

FIG. 3 is a schematic top plan view of the first embodiment. The shown embodiment includes a cartridge chamber 28 for the silver-halide film 5 and a spool 29 onto which to wind the silver-halide film 5. The first embodiment adopts a prewinding system in which the silver-halide film 5 is beforehand wound up onto the spool 29 up to the last frame immediately after the silver-halide film 5 is loaded, and each time a frame is exposed during photography, the exposed frame is sequentially rewound.

The shown embodiment also includes a driving motor 30 for zooming the photographing lens, a driving motor 31 for focusing the photographing lens, a zoom button 32 which is disposed at a position where it can be operated by the right hand of a user, a main-mode selecting switch 33 which also serves as a power source switch, a trigger button 34 for video-moving-image photography, and a shutter button 35 for still-image photography which can be used for photographing a silver-halide still image alone and for simultaneously photographing a moving image and a silver-halide still image.

A mode selecting dial 36 is disposed on the side of the apparatus opposite to the above-described operating members. The mode selecting dial 36 is common to moving-image photography and still-image photography, and is used for selecting a usable mode from among a program exposure mode, a portrait mode which in many cases employs a full-open aperture value, a sports mode for shutter speed priority photography, a backlight mode and the like.

Light measurement is placed under feedback control corresponding to each of the aforesaid various modes in accordance with the level of a luminance signal obtained from the solid-state image pickup element 13. Although in the first embodiment the surface of the solid-state image pickup element 13 for video-moving-image photography is electrically divided into areas so that the solid-state image pickup element 13 is used as a light measuring element, a separate dedicated light measuring element may also be disposed.

A video tape cassette accommodating part 37 is disposed on the right side of the lens unit 2. Although, in the first embodiment, video tape having a tape width of 8 mm is used as a video image recording medium, the kind of usable recording medium is not limited to such video tape. The video tape cassette accommodating part 37 has a recording mechanism which includes a magnetic head cylinder, a capstan, a pinch roller and the like. A control panel 38 for controlling the operation of the video tape, such as recording and reproduction, an eject button 39 for specifying an automatic loading/unloading operation, and the like are disposed on the top face of the video tape cassette accommodating part 37.

Figure 4:
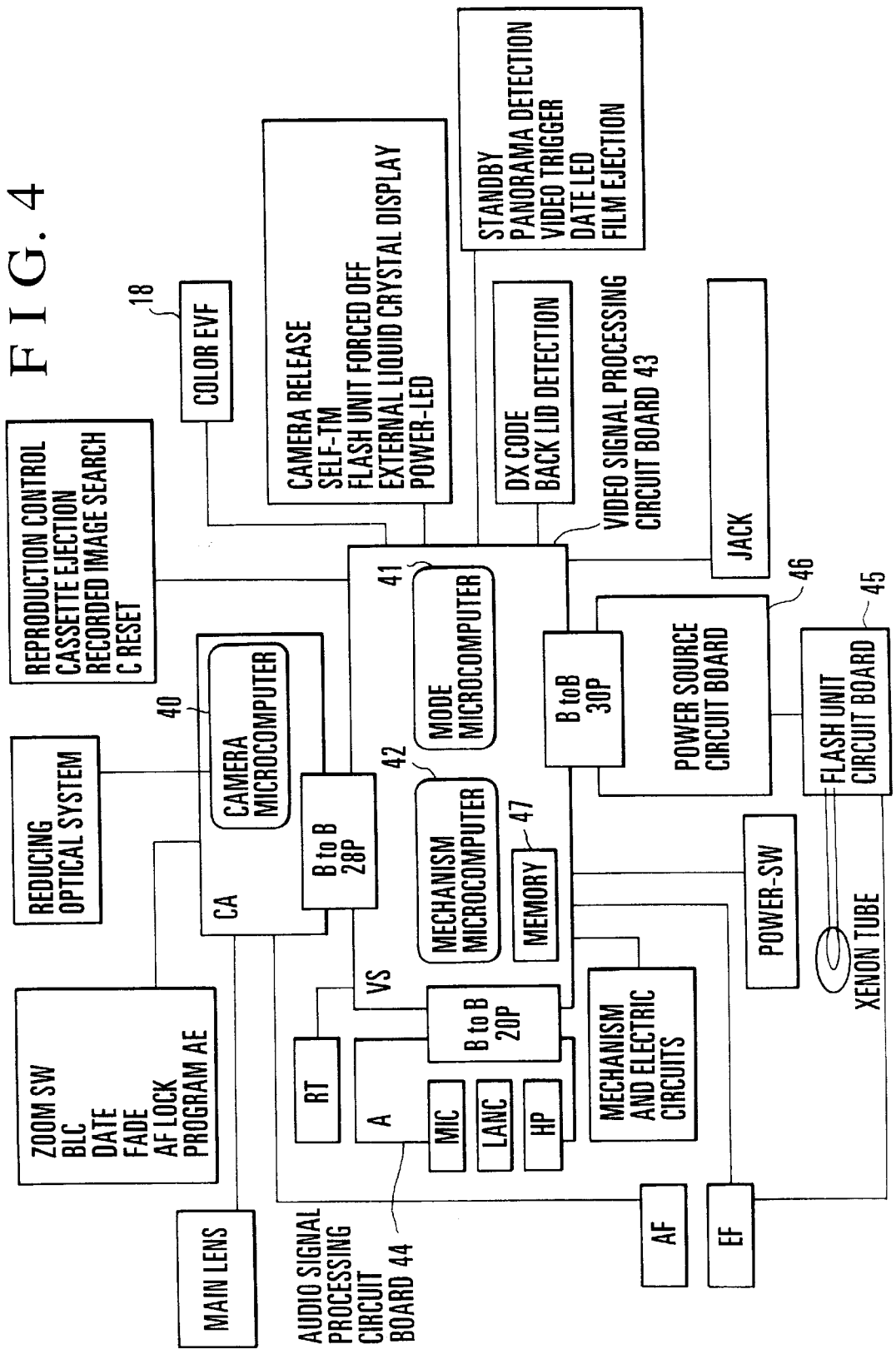
FIG. 4 is a block diagram showing the system control of the first embodiment.

FIG. 4 is a block diagram showing the construction of the system control of the first embodiment. Main cores which constitute the system control are a camera microcomputer 40 which receives an operation input connected with a function, such as zooming, exposure or AF, and controls the corresponding function in accordance with the operation input, a mode microcomputer 41 for controlling the release operation, mode setting and the like of the camera body, and a mechanism microcomputer 42 for controlling and driving a tape recording/reproduction servo mechanism, and other circuits, such as a video signal processing circuit board 43, an audio signal processing circuit board 44, a flash unit circuit board 45 and a power source circuit board 46, are connected to the microcomputers 40 to 42. A field memory 47 is provided for storing an image for one field.

Figure 5:
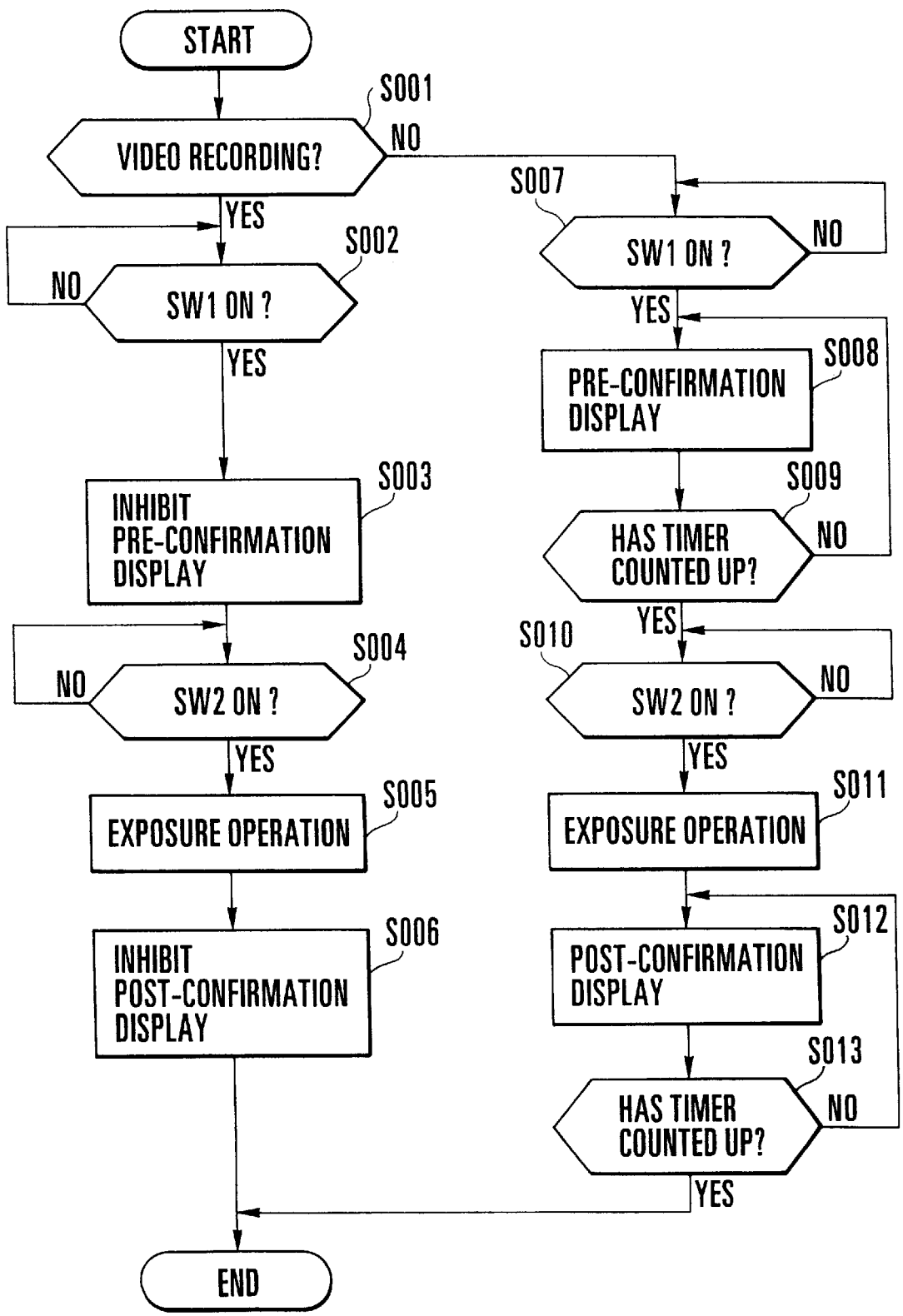
FIG. 5 is a flowchart of the first embodiment.

FIG. 5 is a flowchart showing the operation of the first embodiment.

"S001:VIDEO RECORDING?" If a signal from the trigger button 34 is inputted, the mode microcomputer 41 sends an instruction to the mechanism microcomputer 42 to cause the mechanism microcomputer 42 to execute predetermined control for recording a video moving image on video tape. At the same time, the mode microcomputer 41 checks the state of a signal indicating whether to execute pre- and post-confirmations, which is inputted from the mode selecting dial 36.

"S002:SW1 ON?" If the shutter button 35 is depressed to the first stroke position, the mode microcomputer 41 sends an instruction to the camera microcomputer 40 to cause the camera microcomputer 40 to determine various conditions for still-image exposure, such as shutter speed and aperture value which relate to AF and exposure.

"S003:INHIBIT PRE-CONFIRMATION DISPLAY" While video recording is being performed, if execution of pre- and post-confirmations is selected by the mode selecting dial 36, the mode microcomputer 41 does not store the image needed for pre-confirmation in the field memory 47 nor provide the visual display needed for pre-confirmation in the electronic viewfinder unit 18, irrespective of an input from the SW1 of the shutter button 35.

"S004:SW2 ON?" "S005:EXPOSURE OPERATION" If the shutter button 35 is depressed to the second stroke position, the mode microcomputer 41 executes a series of exposure operations, such as the driving of AF, the driving of the iris diaphragm 4, the opening and closing of the shutter device 6, and the transport of the silver-halide film 5.

"S006:INHIBIT POST-CONFIRMATION DISPLAY" Similarly to the case of "S003:INHIBIT PRE-CONFIRMATION DISPLAY", the mode microcomputer 41 does not store an image in the field memory 47 nor provide a visual display in the electronic viewfinder unit 18.

"S007:SW1 ON?" If video recording is not being performed, the process proceeds to Step S007, in which predetermined conditions for still-image exposure are determined similarly to the aforesaid step "S002:SW1 ON?". At this time, the mode microcomputer 41 transfers to the field memory 47 an image signal for one field which is processed by the video signal processing circuit board 43, at the timing when the shutter button 35 is depressed to the first stroke position.

"S008:PRE-CONFIRMATION DISPLAY" "S009:HAS TIMER COUNTED UP?" The mode microcomputer 41 reads the still image for one field stored in the field memory 47 and provides a visual display on the small liquid crystal display plate 19 in the electronic viewfinder unit 18. In the first embodiment, a timer in the mode microcomputer 41 is made to operate so that the still image for one field is displayed for only three seconds. However, the manner of displaying a still image is not limited to only the aforesaid one, and it is also possible to adopt an arrangement which is capable of continuing to display a still image only while the shutter button 35 is being depressed to the first stroke position.

"S010:SW2 ON?" "S011:EXPOSURE OPERATION" After operations similar to the aforesaid steps "S004:SW2 ON?" and "S005:EXPOSURE OPERATION" have been executed, the mode microcomputer 41 transfers to the field memory 47 an image signal for one field which is processed by the video signal processing circuit board 43, at the timing when the shutter button 35 is depressed to the second stroke position. At this time, the image which has been stored in the field memory 47 for the purpose of pre-confirmation is erased.

"S012:POST-CONFIRMATION DISPLAY" "S011:HAS TIMER COUNTED UP?" A still image is displayed in a manner similar to that carried out in the above-described steps "S008:SW2 ON?" and "S009:HAS TIMER COUNTED UP?". The still image at this time is set to be displayed for a time (in the first embodiment, five seconds) which is longer than the time of the aforesaid pre-confirmation display. This is because the post-confirmation for confirming the state of an actually photographed scene needs a confirmation of more details of a composition, the facial expression of a subject and the like.

With the above-described arrangement and construction as well as the above-described operation control, it is possible to prevent video-moving-image photography from being adversely affected by a still image photographing operation during video recording, and it is also possible to make use of all still-image photographing functions while video recording is not being performed.

(Second Embodiment)

A second embodiment of the present invention has an arrangement and a construction similar to the essential ones of the first embodiment shown in FIGS. 1 to 4. The description of parts which are identical in operation to those of the first embodiment is omitted for the sake of clarity.

In the second embodiment, it is possible to selectively execute each of pre- and post-confirmations, and if a pre- or post-confirmation is executed during the recording of a video moving image, a pre- or post-confirmation display can be provided after the stop of the video recording.

Figure 6:
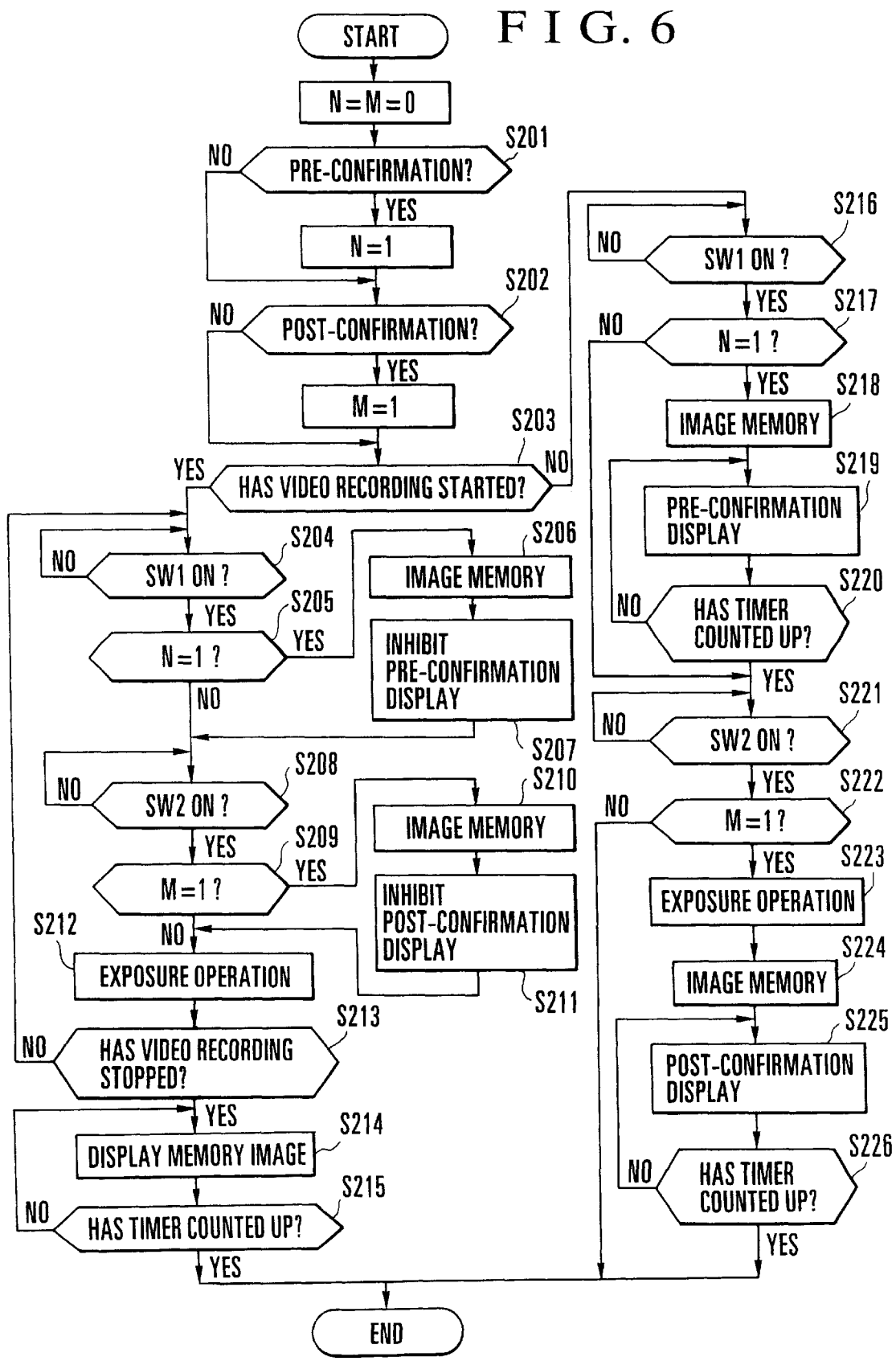
FIG. 6 is a flowchart of a second embodiment.

FIG. 6 is a flowchart showing the operation control of the second embodiment, and the. following description refers to steps which differ from those of the first embodiment.

"S201:PRE-CONFIRMATION?" If a mode for executing pre-confirmation is selected through the mode selecting dial 36, a flag of N=1 is turned on in the mode microcomputer 41.

"S202:POST-CONFIRMATION?" If a mode for executing post-confirmation is selected through the mode selecting dial 36, a flag of M=1 is turned on in the mode microcomputer 41. In the second embodiment, execution of both pre-confirmation and post-confirmation can also be selected through the mode selecting dial 36.

"S205:N=1? YES" "S206:IMAGE MEMORY" "S207:INHIBIT PRE-CONFIRMATION DISPLAY" If a mode for executing pre-confirmation is selected, the mode microcomputer 41 stores an image in the field memory 47 at the input timing of a signal indicative of the first stroke of the shutter button 35. However, at this time, the mode microcomputer 41 inhibits the image from being displayed in the electronic viewfinder unit 18.

"S209:M=1? YES" "S210:IMAGE MEMORY" "S211:INHIBIT POST-CONFIRMATION DISPLAY" If the mode for executing post-confirmation is selected, the mode microcomputer 41 additionally stores an image in the field memory 47 at the input timing of a signal indicative of the second stroke of the shutter button 35. However, at this time, the mode microcomputer 41 inhibits the image from being displayed in the electronic viewfinder unit 18. Incidentally, the field memory 47 has a storage capacity capable of storing a plurality of images.

"S214:DISPLAY MEMORY IMAGE" "S215:HAS TIMER COUNTED UP?" If video recording is stopped, the mode microcomputer 41 sequentially displays each of the stored still images of the field memory 47 for a predetermined time. In the second embodiment, similarly to the first embodiment, a still image for pre-confirmation is displayed for three seconds, while a still image for post-confirmation is displayed for five seconds. However, the display times of the respective still images are not limited to only these values.

"S217:N=1?" "S218:IMAGE MEMORY" "S219:PRE-CONFIRMATION DISPLAY" "S220:HAS TIMER COUNTED UP?" If it is determined in Step S203 that video recording is not being performed, it is determined whether the mode for executing pre-confirmation is selected. If it is determined that the mode for executing pre-confirmation is selected, the mode microcomputer 41 displays the image stored in the field memory 47 at the input timing of the signal indicative of the first stroke of the shutter button 35, in the electronic viewfinder unit 18 for a predetermined time.

"S222:M=1?" "S224:IMAGE MEMORY" "S225:POST-CONFIRMATION DISPLAY" "S226:HAS TIMER COUNTED UP?" If video recording is not being performed and the mode for executing post-confirmation is selected, the mode microcomputer 41 displays the image stored in the field memory 47 at the input timing of the signal indicative of the second stroke of the shutter button 35, in the electronic viewfinder unit 18 for a predetermined time.

With the above-described arrangement and construction as well as the above-described operation control, it is possible to effect image confirmation which meets the request of an operator.

(Third Embodiment)

A third embodiment of the present invention has an arrangement and a construction similar to the essential ones of the first and second embodiments shown in FIGS. 1 to 6. The description of parts which are identical in operation to those of the first and second embodiments is omitted for the sake of clarity.

In an apparatus according to the third embodiment, it is possible to selectively execute each of pre-. and post-confirmations, and if a pre- or post-confirmation is executed during the recording of a video moving image, an electronic viewfinder, which is displaying the video moving image at that time, increases a still-image display area with respect to a moving-image display area and displays a still image in the increased still-image display area.

Figure 7:
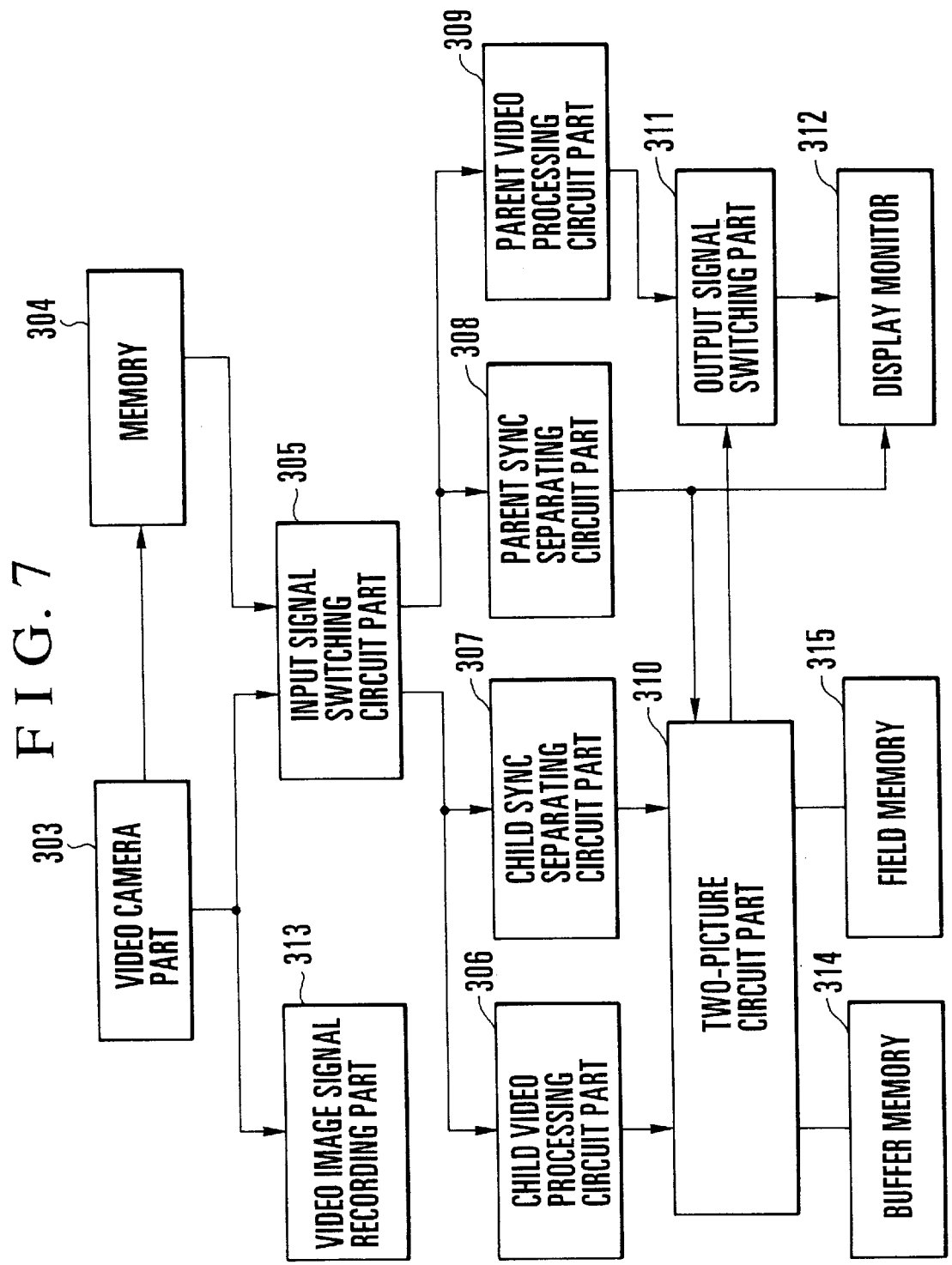
FIG. 7 is a block diagram of a third embodiment.
Figure 10:
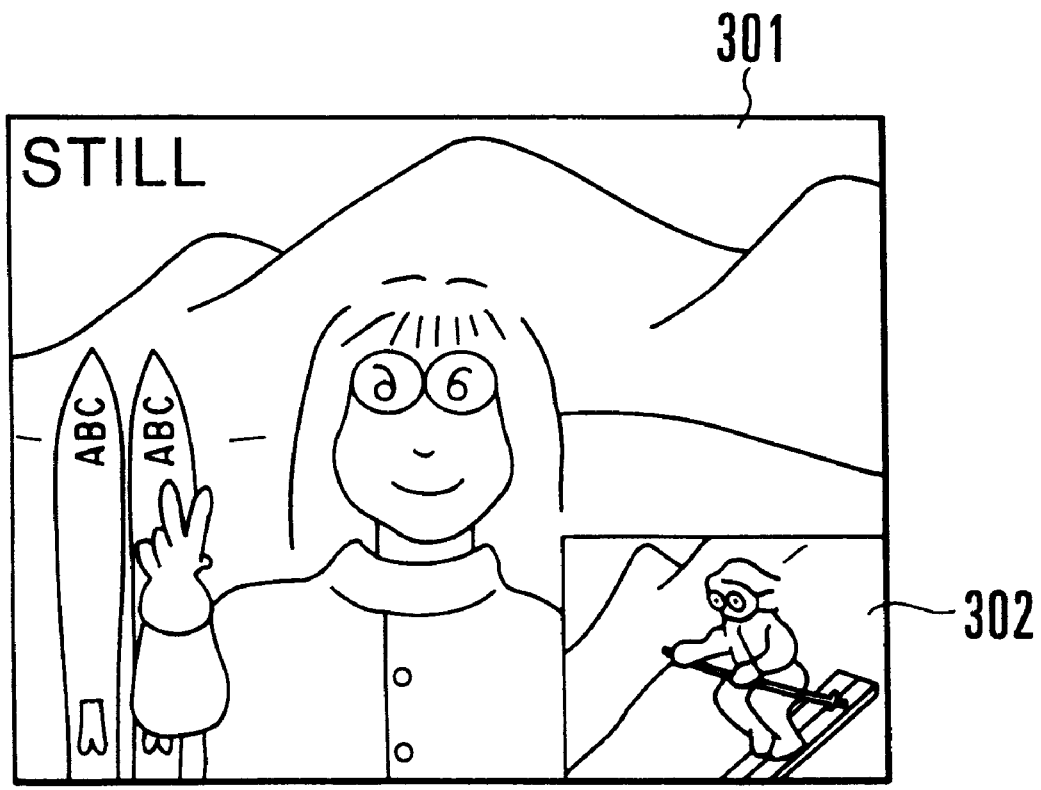
FIG. 10 is a schematic view of a liquid crystal display plate of the third embodiment.

FIG. 7 is a block diagram showing a construction example of the third embodiment capable of simultaneously displaying a child picture 302 having a smaller display area and a parent picture 301 having a larger display area in such a manner that the child picture 302 is combined with the parent picture 301, as shown in FIG. 10.

Normally, while a moving image is being recorded by a video camera part 303, a moving-image signal is inputted to a video image signal recording part 313 and an input signal switching circuit part 305 at the same time. The moving-image signal inputted to the input signal switching circuit part 305 is processed by a parent video processing circuit part 309 and outputted to a display monitor 312.

At this time, if execution of a pre- or post-confirmation is selected, still-image information is stored in a memory 304 at the timing when the shutter button 35 is depressed to the first or second stroke position.

Then, the mode microcomputer 41 supplies via the input signal switching circuit part 305 the still-image information stored in the memory 304 to the parent video processing circuit part 309, and the moving-image signal recorded by the video camera part 303 to a child video processing circuit part 306.

A two-picture circuit part 310 basically temporarily writes the video signal supplied from the child video processing circuit part 306 to a memory in accordance with a synchronizing signal supplied from a child sync separating circuit part 307, and reads the stored video signal from the memory in accordance with a synchronizing signal supplied from a parent sync separating circuit part 308, thereby outputting a video signal for combination.

This video signal is combined with a parent video signal supplied from the parent video processing circuit part 309 at an output signal switching part 311, and the combined video signal is outputted to the display monitor 312 which is driven by the synchronizing signal supplied from the parent sync separating circuit part 308.

Figure 8:
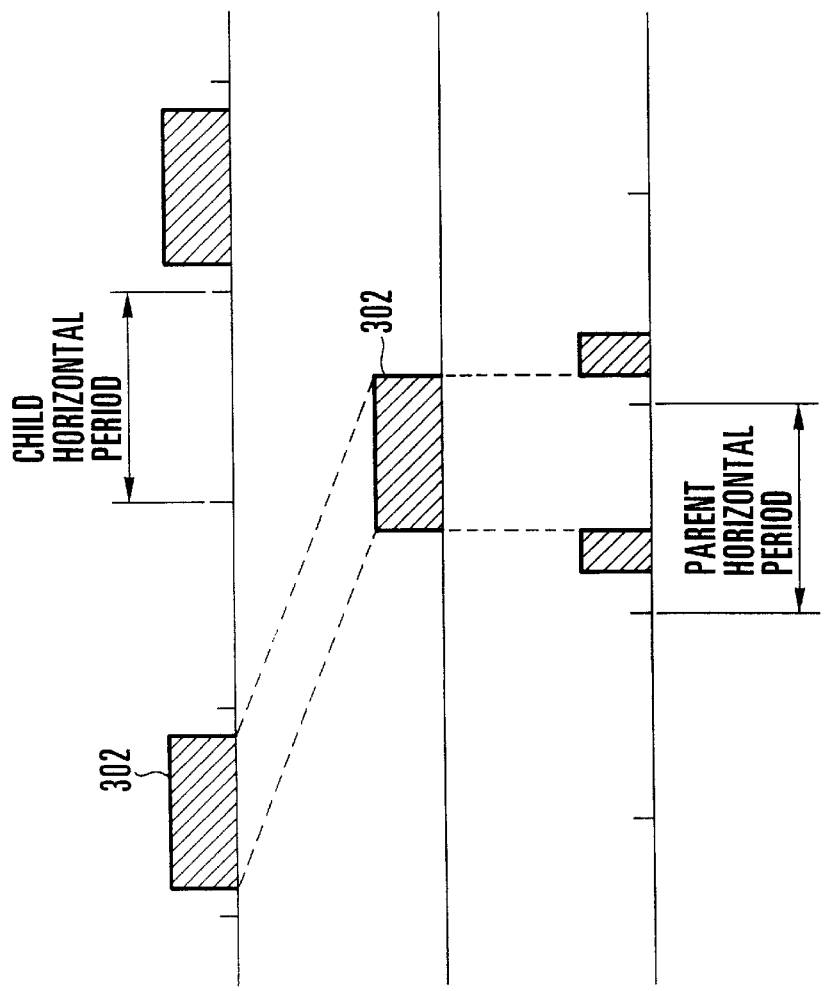
FIGS. 8(A), 8(B) and 8(C) are timing charts of the third embodiment.

FIGS. 8(A), 8(B) and 8(C) are timing charts showing a case where the child picture 302 is made one-third of the parent picture 301 in height and width.

First, as shown in FIG. 8(A), data is written to a buffer memory 314 in synchronism with a child horizontal synchronizing signal. In this case, data for one of three horizontal periods may be written to make the height one-third.

Since the buffer memory 314 has a storage capacity for one horizontal period, the data needs to be sent to a field memory 315 which is a main storage memory, by the time when the next data writing is started. The timing at which to send the data is a period during which the buffer memory 314 is not performing a writing operation and the field memory 315 is not performing a reading operation.

As shown in FIG. 8(C), during the period over which the child picture 302 is outputted, the field memory 315 performs a reading operation each horizontal period in synchronism with each parent horizontal period. However, to make the width of the child picture 302 one-third the width of the parent picture 301, the data is read from the field memory 315 at a speed approximately three times the speed at which the data is written to the field memory 315.

During the period over which the child picture 302 is outputted, the field memory 315 does not has a large margin. However, if the writing period of the buffer memory 314 of FIG. 8(A) is made not greater than three-fourths of the child horizontal period, the reading period of the field memory 315 of FIG. 8(C) becomes ⅓×¾, i.e., a ¼ horizontal period, so that a margin of an approximately ¾ horizontal period is obtained between each reading operation and the next reading operation of the field memory 315. By utilizing this margin, as shown in FIG. 8(B), the data of the buffer memory 314 can be sent to the field memory 315.

Figure 9:
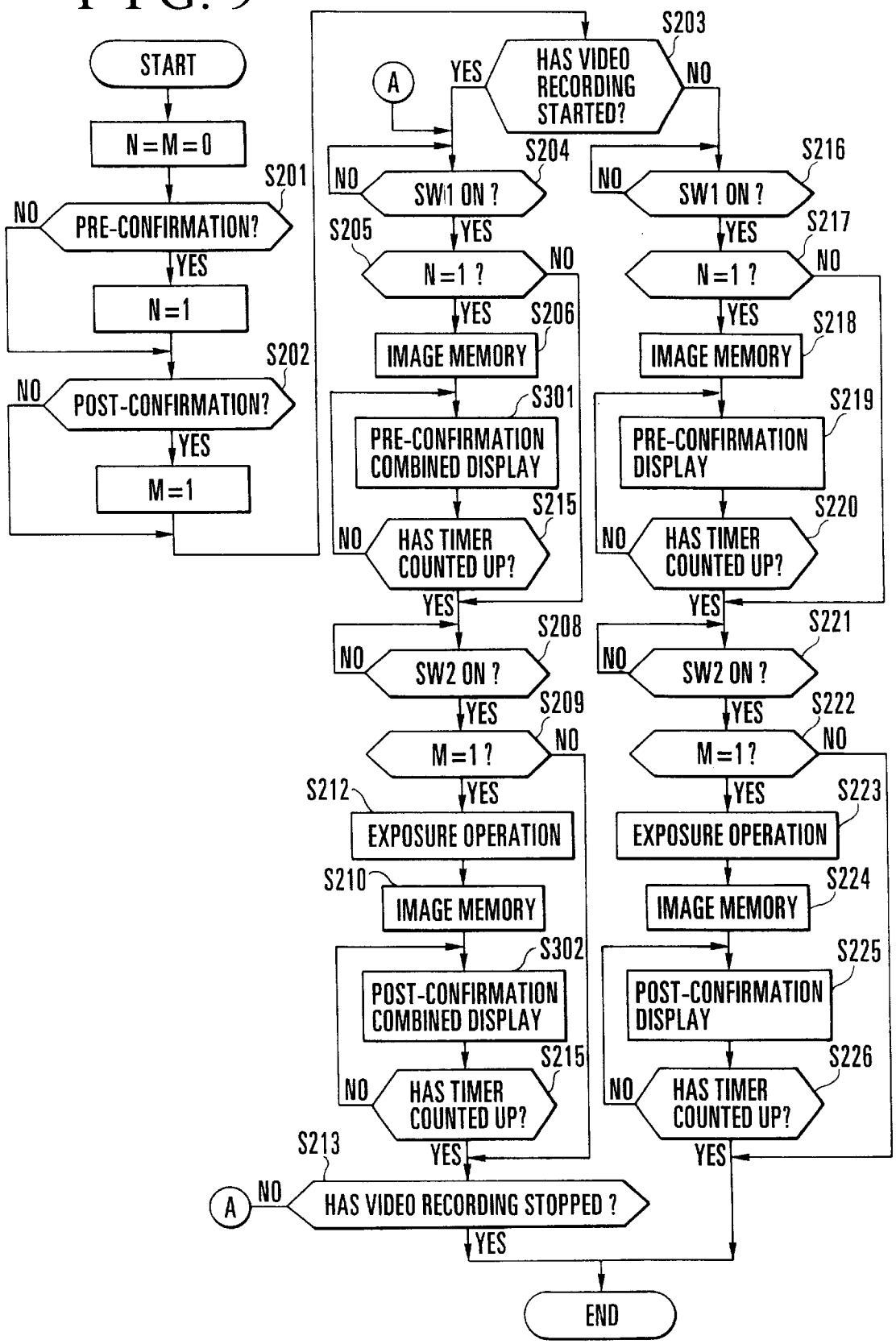
FIG. 9 is a flowchart of the third embodiment.

FIG. 9 is a flowchart showing the operation of the third embodiment. In the following description, reference will be made to steps which differ in operation from those described previously in connection with the first or second embodiment.

"S301:PRE-CONFIRMATION COMBINED DISPLAY"
"S302:POST-CONFIRMATION COMBINED DISPLAY"
If a pre- or post-confirmation is to be executed during the recording of a video moving image, the mode microcomputer 41 executes the processing of reducing the video moving image represented by the signal outputted from the video signal processing circuit board 43 which is displaying the video moving image in the entire area of the small liquid crystal display plate 19 within the electronic viewfinder unit 18. In addition, the mode microcomputer 41 reads the pre- or post-confirmation still image stored in the field memory 47 and displays the read still image in the entire area of the small liquid crystal display plate 19 so that the still image and the reduced video moving image are combined and simultaneously displayed.

FIG. 10 is a schematic view showing the state in which the parent picture 301 and the child picture 302 are displayed on the small liquid crystal display plate 19 in the electronic viewfinder unit 18, and the parent picture 301 is the pre- or post-confirmation still image and the child picture 302 is the moving image which is continuously being photographed.

Since the area of the still image 301 is made larger than that of the moving image 302, a photographer can confirm on a large picture a scene which is photographed by a still camera part, so that the photographer can readily confirm details of the composition or the facial expression of a subject. In addition, the photographer can confirm the moving image which is being photographed at the same time.

As is apparent from the above description, according to any of the above-described embodiments, during the recording of moving-image information by video camera means, display means continuously displays the moving image which is being recorded, so that the recording of the moving-image information by the video camera means can be carried out without any problem.

In the case of recording carried out by still camera means, a pre-confirmation display and/or a post-confirmation display are provided on recording displaying mans in such a manner as not to hinder the recording of moving-image information by the video camera means.

Specifically, by adopting an arrangement which enables the recording displaying means to provide, after the recording of moving-image information is stopped, a pre-confirmation display and/or a post-confirmation display indicative of a still image recorded by the still camera means, the photographer can confirm a video image of the photographed still image.

Alternatively, it is also possible to adopt an arrangement which is capable of continuously displaying an image recorded by the video camera means in a part of the display plane of the recording displaying means, and, at the same time, providing a pre-confirmation display or a post-confirmation display indicative of a still image recorded by the still camera means, in the part of the display plane that is wider than the part in which the image recorded by the video camera means is continuously displayed. According to such arrangement, while the video camera means is readily and securely carrying out recording, the still camera means can also readily and securely carry out recording.

It is to be noted that it is also possible to realize a higher functional efficiency and a greater cost reduction by eliminating the need to store a still image in a memory during the recording of a moving image.

A fourth embodiment of the present invention will be described below.

The conventional types of video cameras integrated with still cameras involve the following problems in addition to the previously described problems.

For example, as described previously, none of the conventional apparatus has succeeded in offering a satisfactory solution which makes it possible to prevent the complexity of operability from increasing owing to the integration of two such separate devices, one for handling a moving image and the other for handling a still image. According to any of the conventional apparatus, users cannot readily enjoy the desired photography.

A so-called pre-confirmation function has heretofore been known. The pre-confirmation function allows a user to confirm still-image information through a monitor or the like before the still-image information is recorded on a recording medium, so that the user can grasp the state of a still image to be actually recorded on the recording medium. There has also been a post-confirmation function which allows a user to confirm a recorded content, by displaying information recorded on a recording medium on a monitor or the like.

Japanese Laid-Open Patent Application No. Hei 3-261287 proposes an apparatus arranged to record a moving image and also record a still-image signal obtained from a moving-image video signal at an arbitrary timing. When a user operates a predetermined switch, the apparatus records a still-image signal and visually displays the still-image signal in an electronic viewfinder for a predetermined time.

According to this apparatus, if a still image is recorded, the user can confirm the recorded still image, so that it is possible to make a good recording of the still image.

The apparatus of U.S. Pat. No. 5,138,460 is a camera which is arranged to display both a photographed image and a new image at the same time in a substantially seamless manner.

According to this apparatus, a user can enjoy photography, such as panoramic photography in which a plurality of photographic frames are seamed together, while confirming a stored image on display means.

However, none of the above-identified specifications contains a substantial description as to the case in which still-image information to be stored is accompanied by a flash emission.

As is known, since silver-halide film which is a recording medium for silver-halide cameras may become lower in sensitivity than a solid-state image pickup element of the type normally used in video cameras, it is necessary to provide a silver-halide camera with a flash part as an auxiliary light source. However, if the flash part emits light while a video camera part is executing photography, its solid-stage image pickup element becomes unable to maintain ordered transfer of signals owing to external stimuli due to an excessive amount of light and sends out a disordered signal train.

For this reason, if the flash part of a still camera part emits light, an image which contains a scene illuminated with the flash emission becomes a visually impaired image in which a phenomenon, such as smear or blooming, has occurred.

Accordingly, in a case where the user executes a pre- or post-confirmation of photography accompanied by a flash emission, even if an image which contains a scene illuminated with the flash emission is merely stored on as-is basis, the user will not be able to obtain an image which is good enough for the user to perform such confirmation.

An object of the fourth embodiment which will be described below is to provide a video camera integrated with a still camera which is capable of solving the above-described problems and which is capable of providing a good confirmation display of a still image if an emission of a flash part of the still camera occurs when a pre- or post-confirmation is to be performed during the use of the video camera integrated with the still camera.

To achieve the above object, in accordance with the following fourth embodiment, there is provided a video camera integrated with a still camera which comprises video camera means for recording moving-image information on a first recording medium, still camera means for recording still-image information on a second recording medium, memory means for storing image information obtainable from the video camera means, display means for displaying the image information, control means for generating control timing and controlling each of the video camera means, the still camera means, the memory means and the display means, and operating means for allowing a user to perform photographing and recording operations. The still camera means has a flash part, and the operating means has a mode setting part for setting execution of a pre-confirmation to temporarily display an image immediately preceding an image to be recorded by the still camera means or execution of a post-confirmation to temporarily display an image recorded by the still camera means. When the pre-confirmation or the post-confirmation of a recording made by the still camera means which recording is accompanied by an emission of the flash part is to be performed, the control means executes control to store in the memory means image information for one field which is recorded by the video camera means and which does not include image information for one field which contains the emission of the flash part, and visually display the stored image information on the display means.

In accordance with the following fourth embodiment, there is also provided a video camera integrated with a still camera which comprises video camera means, still camera means, memory means, display means, control means and operating means, and in which when a pre-confirmation or a post-confirmation of a recording made by the still camera means which recording is accompanied by an emission of a flash part is to be performed, the control means executes control to make an exposure control value of the video camera means approximately equal to a correct exposure control value which allows the still camera means to achieve a correct exposure when the flash part emits light, and executes control to store in the memory means image information for one field which contains the emission of the flash part and visually display the stored image information on the display means.

In accordance with the following fourth embodiment, there is also provided a video camera integrated with a still camera which comprises video camera means, still camera means, memory means, display means, control means and operating means, and in which when a pre-confirmation of a recording made by the still camera means which recording is accompanied by an emission of a flash part is to be performed, the control means executes control to cause the flash part to emit light by an amount of emission smaller than an amount of emission which corresponds to a correct exposure control value of the still camera means, store in the memory means image information for one field which contains the emission of the flash part, and visually display the stored image information on the display means.

In accordance with the following fourth embodiment, there is also provided a video camera integrated with a still camera in which when the pre-confirmation of the recording made by the still camera means is to be performed, the control means responds to a signal SW1 generated when a shutter button of the still camera means is depressed to a first stroke position, and executes control to store in the memory means the image information for one field photographed by the video camera means and visually display the stored image information on the display means.

In accordance with the following fourth embodiment, there is also provided a video camera integrated with a still camera in which when the post-confirmation of the recording made by the still camera means is to be performed, the control means responds to a signal of an X contact which is a trigger to cause an emission of the flash part of the still camera means, and executes control to store in the memory means the image information for one field photographed by the video camera means and visually display the stored image information on the display means.

In accordance with the following fourth embodiment, there is also provided a video camera integrated with a still camera in which if the execution of the pre-confirmation of the recording made by the still camera means is set, the control means starts exposure control of the video camera means in response to an input of a signal SW1 generated when a shutter button of the still camera means is depressed to a first stroke position, whereas if the execution of the post-confirmation of the recording made by the still camera means is set, the control means starts exposure control of the video camera means in response to an input of a signal SW2 generated when the shutter button of the still camera means is depressed to a second stroke position.

In accordance with the following fourth embodiment, there is also provided a video camera integrated with a still camera in which when a pre- or post-confirmation of a recording made by the still camera means which recording is accompanied by an emission of the flash part is to be performed, one field of image information recorded by the video camera means, which does not include image information for one field which contains the emission of the flash part, is stored in the memory means and is displayed on the display means, so that a visually impaired image which is devoid of density owing to a flash emission is not displayed and it is possible to readily and securely carry out the pre- or post-confirmation of the recording made by the still camera means.

In accordance with the following fourth embodiment, there is also provided a video camera integrated with a still camera in which when a pre- or post-confirmation of a recording made by the still camera means which recording is accompanied by an emission of the flash part is to be performed, the video camera means is controlled so that the exposure control value of the video camera means is made approximately equal to a correct exposure control value which allows the still camera means to achieve a correct exposure when the flash part emit s light, and image information for one field which contains the emission of the flash part is displayed on the display means, so that it is possible to readily and securely carry out a pre- or post-confirmation of a photographic recording based on a correct exposure accompanied by a flash emission of the still camera means.

In accordance with the following fourth embodiment, there is also provided a video camera integrated with a still camera in which when a pre-confirmation of a recording made by the still camera means which recording is accompanied by an emission of the flash part is to be performed, the flash part is made to emit light by an amount of emission smaller than an amount of emission which corresponds to a correct exposure control value of the still camera means, and image information for one field which contains the emission of the flash part is visually displayed on the display means, so that it is possible to readily and securely carry out a pre-confirmation of a photographic recording accompanied by a flash emission of the still camera means.

In accordance with the following fourth embodiment, there is also provided a video camera integrated with a still camera in which when a pre-confirmation of a recording made by the still camera means is to be performed, the control means executes control in response to a signal SW1 generated when a shutter button of the still camera means is depressed to a first stroke position, whereas when a post-confirmation of a recording made by the still camera means is to be performed, the control means executes in response to a signal of the X contact which is a trigger to cause an emission of the flash part, so that image information for one field indicative of an image photographed by the video camera means can be stored in the memory means with a minimum time lag and can be readily and securely displayed on the display means.

The fourth embodiment of the present invention will be described below in detail with reference to the accompanying drawings.

(Fourth Embodiment)

Figure 11:
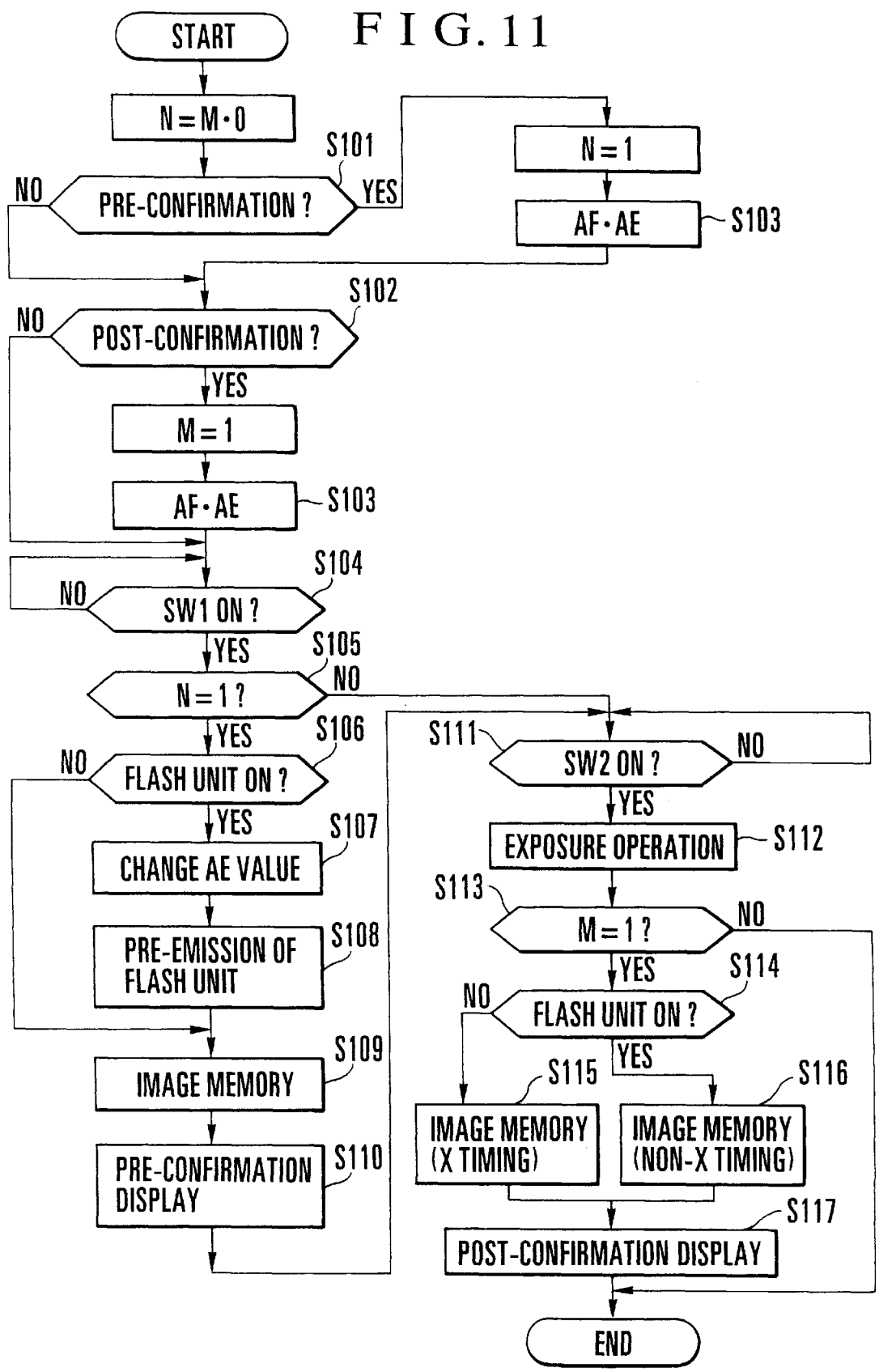
FIG. 11 is a flowchart of a fourth embodiment.

The arrangement and construction of the fourth embodiment are similar to those shown in the block diagrams of FIGS. 1, 2 and 3. FIG. 11 is a flowchart showing control which constitutes a feature of the fourth embodiment. According to the fourth embodiment, the apparatus has a trigger button (indicated by 34 in FIG. 3) for video-moving-image photography and a shutter button (indicated by 35 in FIG. 3) for silver-halide still-image photography.

If a pre- or post-confirmation mode is selected through the mode setting means 104 shown in FIG. 1 (S101, S102), the control means 101 stores an image signal for one field indicative of an image picked up by the video camera part 102 in the memory means 105 (S109) at the input timing of a signal indicative of the first stroke of the shutter button 35 (S104), and displays a still image for a predetermined time by using the display means 106 (S110). After that, if the control means 101 receives a signal indicative of the second stroke of the shutter button 35 (S111), the control means 101 executes AF and AE control of the still camera part 103, thereby effecting exposure of film (S112).

At this time, the control means 101 causes the memory means 105 to again store an image signal for one field indicative of an image picked up by the video camera part 102, at the input timing of the signal indicative of the second stroke of the shutter button 35 (S115). Then, the control means 101 displays a still image for a predetermined time by using the display means 106 (S117).

In this manner, according to the above-described arrangement, it is possible to execute the pre-confirmation which allows a photographer to check a composition and the like before a silver-halide still photograph is taken, as well as the post-confirmation which allows a photographer to check an image at substantially the same timing that an exposure operation is actually performed, after the completion of the exposure operation.

The image signal stored at the input timing of the signal indicative of the first or second stroke of the shutter button 35 will be described below.

Figure 12:
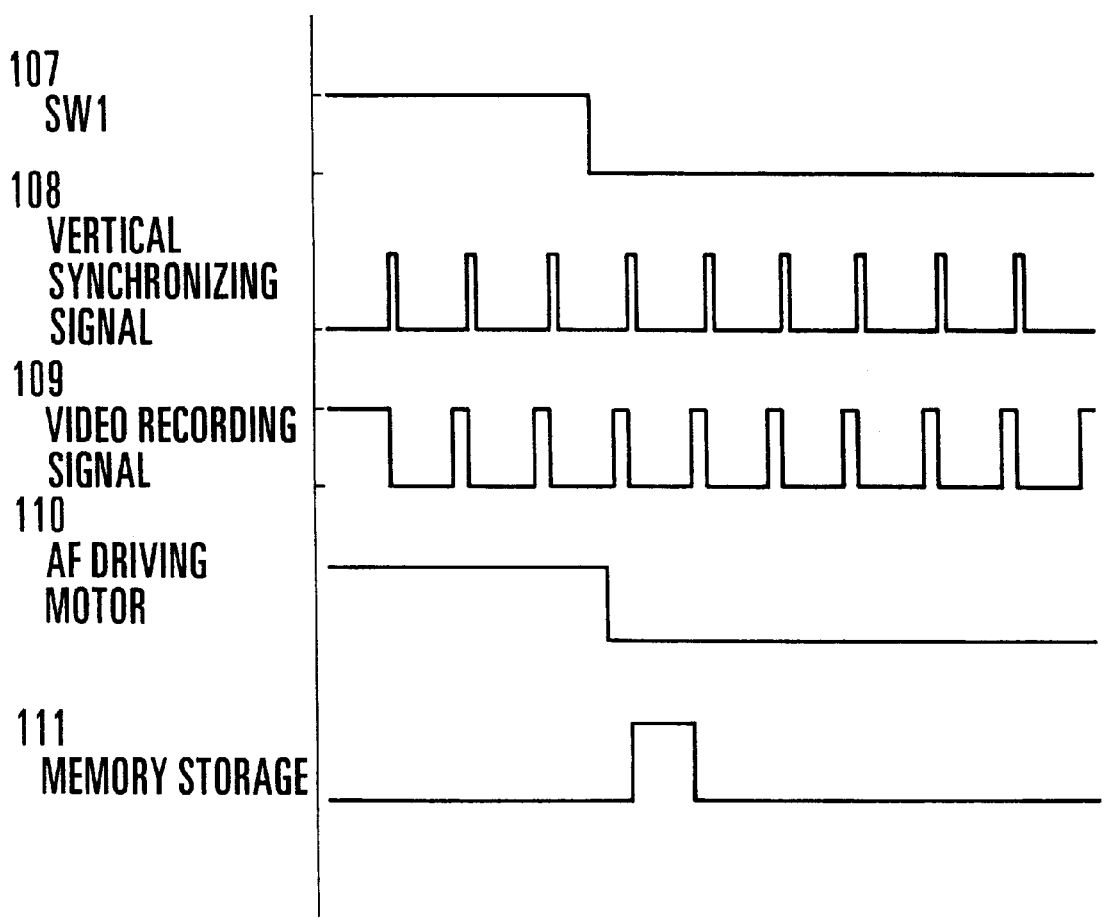
FIG. 12 is a timing chart of a pre-confirmation of the fourth embodiment.

FIG. 12 is a timing chart showing the states of. relevant circuits and signals during the execution of a pre-confirmation. If a photographer selects the mode for executing pre-confirmation through the mode setting means 104, the control means 101 starts AF and AE control of the still camera part 103 (S103). After that, if the photographer depresses the shutter button 35 to the first stroke position, a signal 107 is generated from the SW1 (S104). When receiving the signal 107, the control means 101 stops the energization of an AF driving motor 110 to complete focusing, and also determines an AE value.

The control means 101 checks the state of the signal 107 at the intervals of the period of a vertical synchronizing signal 108 which provides a reference for video recording, and stores in the memory means 105 a video recording signal 109 for one field which is obtained through the aforesaid series of operations (111) (S109). The image information for one field which has been stored in the memory means 105 is displayed on the display means 106, such as the electronic viewfinder unit (indicated by 18 in FIG. 2), so that the photographer can perform a pre-confirmation for confirming the state of a still image to be recorded, before an exposure operation is actually performed (S110).

Since an actual exposure operation is not performed, as long as the pre-confirmation is executed at the input timing of the signal indicative of the first stroke of the shutter button 35, the pre-confirmation does not impose severe limitations on the conditions of the video recording signal 109 to be stored in the memory means 105. However, the post-confirmation which will be described later needs an operation which differs from the operation of the above-described pre-confirmation, because it is necessary to display the video recording signal 109 which is obtainable, preferably at a timing as close as possible to the timing of execution of the actual exposure operation.

Figure 13:
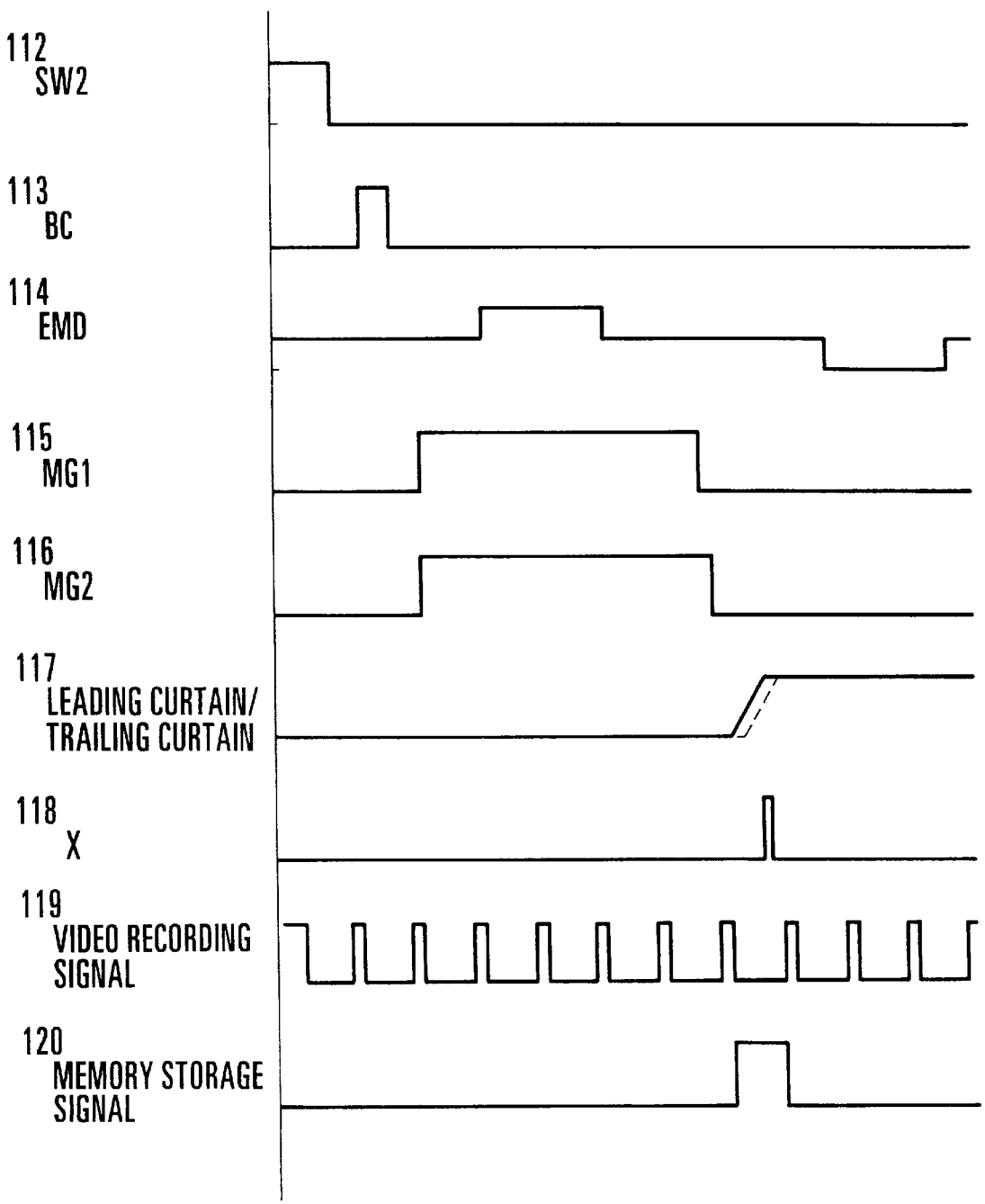
FIG. 13 is a timing chart of a post-confirmation of the fourth embodiment.

FIG. 13 is a timing chart showing the states of relevant circuits and signals during the execution of the post-confirmation. If the photographer selects the mode for executing post-confirmation through the mode setting means 104, the following operation is performed.

A signal 112 is the signal generated from the SW2 when the photographer depresses the shutter button 35 to the second stroke position to take a still photography (S111). When the signal 112 of the Sw2 is inputted to the control means 101, the control means 101 starts to control the still camera part 103. A signal 113 is a battery check signal BC which is used for determining whether photography is possible, as by energizing, for example, a film winding motor in the still camera part 103. A signal 114 is applied to an iris driving motor EMD so that the iris driving motor EMD can be energized for a predetermined time to stop down the iris diaphragm (indicated by 4 in FIG. 2).

A signal 115 is a signal for controlling a leading-curtain magnet MG1 of the shutter device (indicated by 6 in FIG. 2), and a signal 116 is a signal for controlling a trailing-curtain magnet MG2 of the shutter device. The magnets MG1 and MG2 of the fourth embodiment are arranged so that when each of the magnets MG1 and MG2 is deenergized, the shutter curtain (indicated by 6a in FIG. 2) runs. The leading-curtain magnet MG1 and the trailing-curtain magnet MG2 are controlled to be deenergized after the passage of a predetermined time so that the iris diaphragm 4 is stopped down to a required aperture value by the iris driving motor EMD and each mechanism becomes stable.

A waveform 117 represents the states of running of leading and trailing curtains, and an inclined solid line and an inclined dashed line represent the running of the leading curtain and the running of the trailing curtain, respectively. The parallelogram defined by the solid and dashed lines represents the amount of exposure. Actually, a time lag is present between the moment when each of the magnets MG1 and MG2 is deenergized and the moment when the respective one of the leading and trailing curtains actually start to run. In the fourth embodiment, the time lag is approximately 5 ms (S112).

A signal 118 is a signal indicative of the on state of an X contact which is a trigger of an emission of the flash unit 24. The X contact is arranged to be turned on by a mechanism switch incorporated in the shutter device 6 upon the completion of running of the leading curtain.

The signal 118 of the X contact is most reliable and temporally closest to the timing at which exposure is actually performed. If the mode for executing post-confirmation is selected by the photographer, the control means 101 extracts from a video recording signal 119 information for one field which contains the signal 118 of the X contact and stores such information in the memory means 105 with reference to the signal 118 of the X contact (120) (S115). This information is displayed on the display means 106 in the electronic viewfinder unit 18 or the like for a predetermined time similarly to the case of the pre-confirmation, so that, after the exposure of film to an image, the photographer can confirm image information approximately equivalent to the image actually recorded on the film (S117).

Incidentally, system control for executing various kinds of processing according to the fourth embodiment is similar to that described previously in connection with FIG. 4, and is performed by a microcomputer in accordance with a stored program.

A pre- or post-confirmation accompanied by an emission of the flash unit 24 will be described below.

FIG. 14 is a timing chart showing the operation of executing a post-confirmation accompanied by an emission of the flash unit 24 in the fourth embodiment.

If an external luminance 121 becomes low when photography is to be performed, the video iris unit 11 of the reducing lens unit 10 is driven (122) to keep constant the amount of light to be inputted to the solid-state image pickup element 13, so that a CCD output 125 can be controlled to become constant.

At this time, if the photographer depresses the shutter button 35 to the second stroke position and the signal 112 is inputted to the control means 101, the control means 101 generates a release timing signal 123 and executes control of the still camera part 103 in a manner similar to the above-described manner. After that, if a signal 124 of the X contact is inputted to the control means 101, the control means 101 causes the flash unit 24 to emit light.

However, there is a difference between an exposure control value which is determined on the basis of the sensitivity of the solid-state image pickup element 13 of the video camera part 102, the F-number of the reducing lens unit 10 and the like and an exposure control value which is determined on the basis of the ISO sensitivity of film loaded in the still camera part 103 and the F-number of a photographing optical system, so that if the flash unit 24 of the still camera part 103 is made to emit light in accordance with the exposure control value of the video camera part 102, a video image exposure level 127 will reach a value at which information for one field obtained when a subject receives the light emitted from the flash unit 24 is overexposed. In the fourth embodiment, if the ISO sensitivity is 100, a correct exposure control value for the video camera part 102 is four steps higher than that for the still camera part 103.

For this reason, if a post-confirmation is accompanied by an emission of the flash unit 24, the control means 101 ignores a video recording signal 126 for one field which contains the signal 118 of the X contact, with reference to this signal 118 of the X contact, and stores the video recording signal 126 for the next one field in the memory means 105 (memory storage signal 128) (S116).

Figure 15:
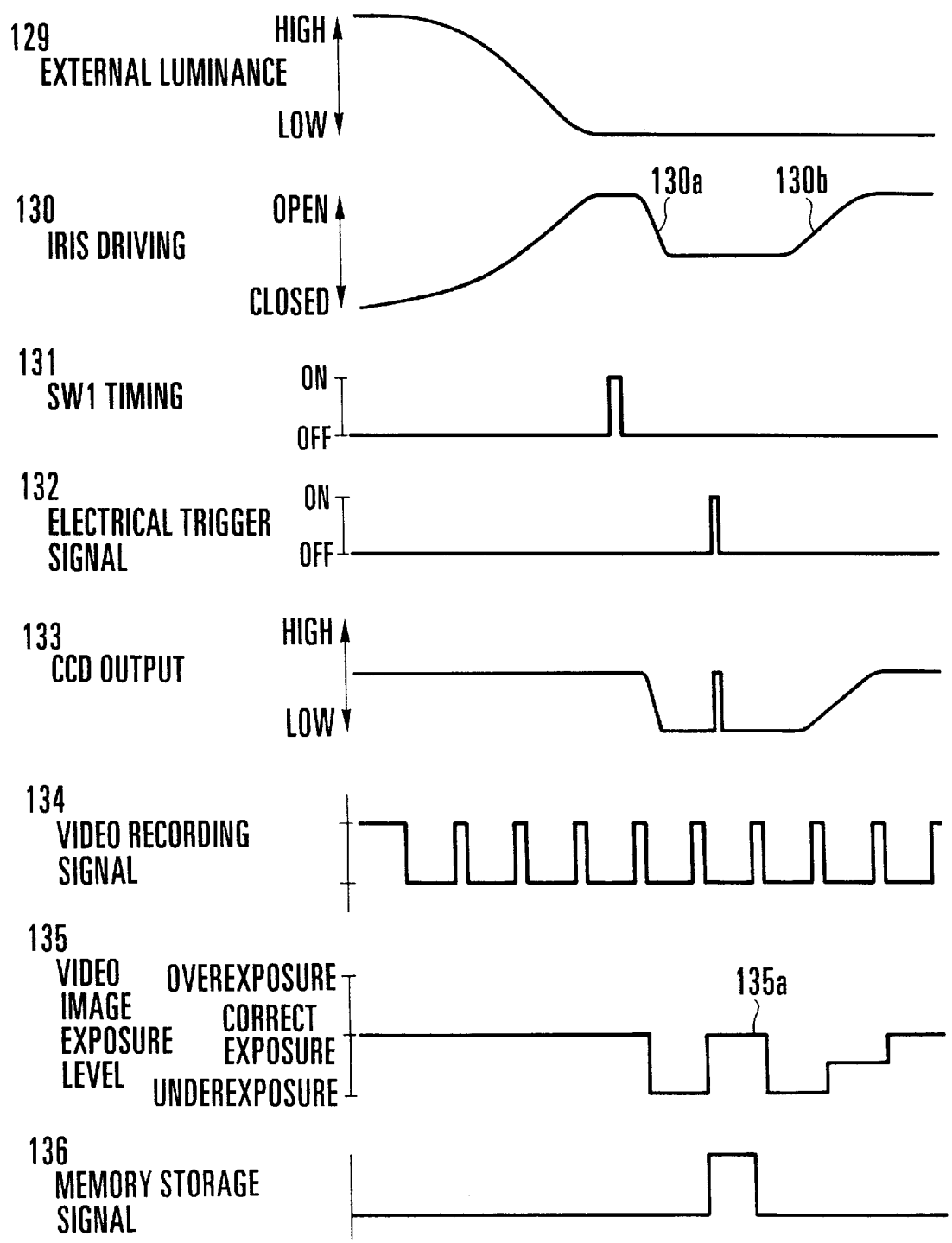
FIG. 15 is a timing chart of a pre-confirmation accompanied by a flash emission according to the fourth embodiment.

FIG. 15 is a timing chart showing the operation of executing a pre-confirmation accompanied by an emission of the flash unit 24 in the fourth embodiment.

If an external luminance 129 becomes low when photography is to be performed, the video iris unit 11 of the reducing lens unit 10 is driven to keep constant the amount of light to be inputted to the solid-state image pickup element 13, so that the CCD output 125 can be controlled to be kept constant.

At this time, if the photographer depresses the shutter button 35 to the first stroke position and the signal 107 from the SW1 is inputted to the control means 101, the control means 101 generates a signal 131 indicative of the timing of the SW1. When the signal 131 is inputted to the control means 101, the control means 101 drives the video iris unit 11 for the purpose of changing an exposure control value from a correct value for the video camera part 102 to a correct value for the still camera part 103, that is, stops down the video iris unit 11 by approximately four steps with respect to the video camera part 102 (130a) (S107).

Accordingly, at this time, a CCD output 133 becomes low for the video camera part 102 and a video image exposure level 135 becomes an underexposure level.

After the video iris unit 11 is driven (131), the control means 101 generates an electrical trigger signal 132 so that the flash unit 24 can be made to emit light not through the mechanical X contact but by the application of an electrical trigger signal. Thus, the flash unit 24 emits light in response to the electrical trigger signal 132.

Since the amount of emission of the flash unit 24 is controlled so that a correct exposure value is obtained in the still camera part 103, when the flash unit 24 emits light, a video recording signal 134 for one field which contains an emission of the flash unit 24 reaches a correct video image exposure level, as shown at 135a. Accordingly, the control means 101 stores in the memory means 105 the information for one field which contains the electrical trigger signal 132, and visually displays this stored information on the display means 106, such as the electronic viewfinder unit 18, for a predetermined time, whereby the photographer can perform pre-confirmation of photography accompanied by a flash emission.

After that, the control means 101 again drives the video iris unit 11 to be opened so that a correct exposure control value for the video camera part 102 can be obtained (130b). Thus, the video image exposure level 135 returns to the correct exposure control level for the video camera part 102.

The above-described change of the exposure control value can similarly be carried out in the case of a post-confirmation as well.

Specifically, the control means 101 starts to control the driving of the video iris unit 11 (130), with reference to the signal SW2 generated when the shutter button 35 is depressed to the second stroke position, in place of the timing signal 131 of the switch SW1, and stores in the memory means 105 information indicative of the video recording signal 134 for one field which contains a flash emission executed at the timing of a signal of the X contact, and visually displays the stored information on the display means 106. Thus, the photographer can perform post-confirmation of photography which contains a correct flash emission.

(Fifth Embodiment)

The arrangement and construction of a fifth embodiment of the present invention are similar to those of the fourth embodiment. An operation which constitutes a feature of the fifth embodiment will be described below with reference to FIGS. 16 and 17. Identical reference numerals are used to denote parts which are identical in operation to those of the fourth embodiment, and the description thereof is omitted.

An apparatus according to the fourth embodiment is characterized by control capable of preventing an exposure control value for a video camera part from reaching an overexposure value which gives rise to a visually impaired image devoid of density, as the result of a flash emission, when a photographer is to perform a pre-confirmation accompanied by the flash emission.

Figure 16:
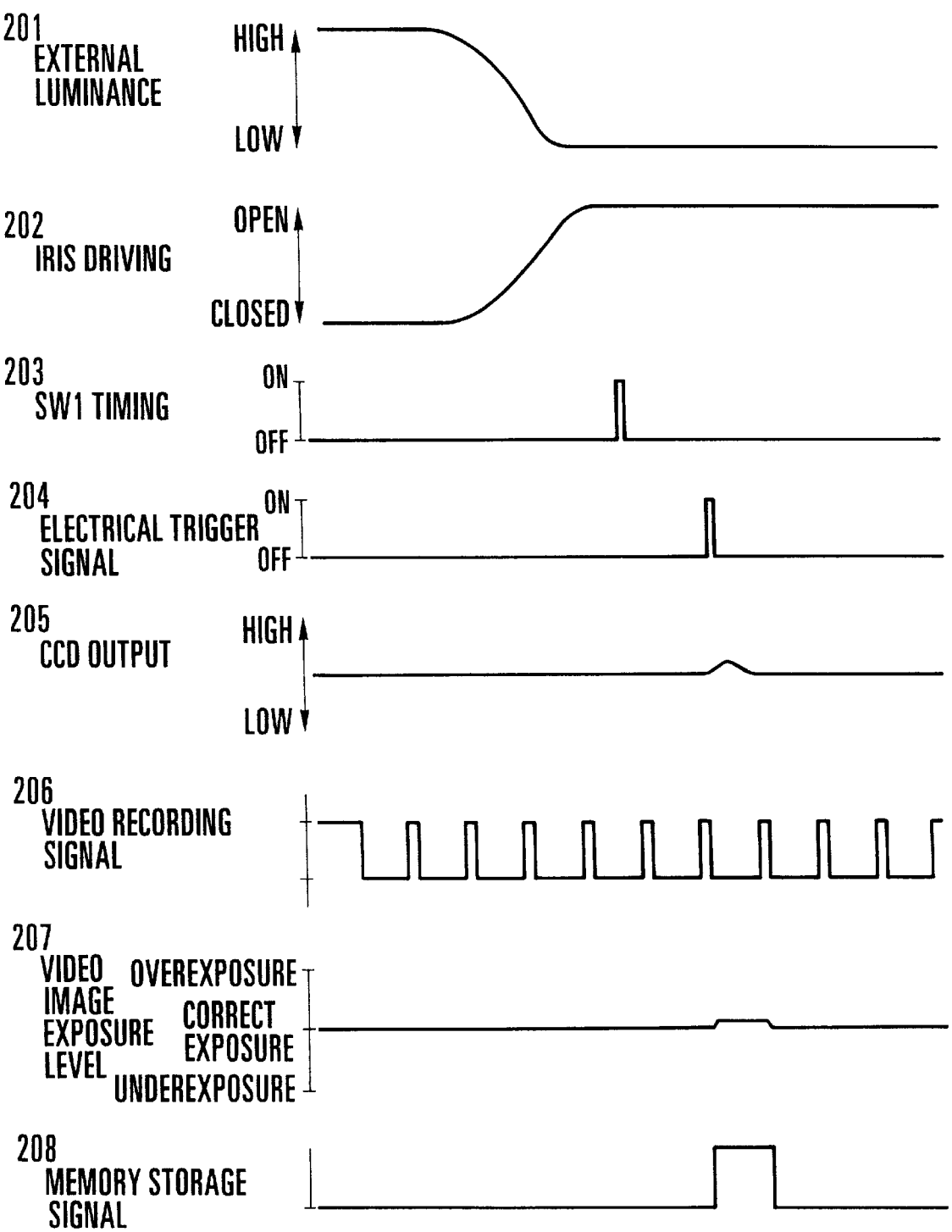
FIG. 16 is a timing chart of a fifth embodiment.
Figure 17:
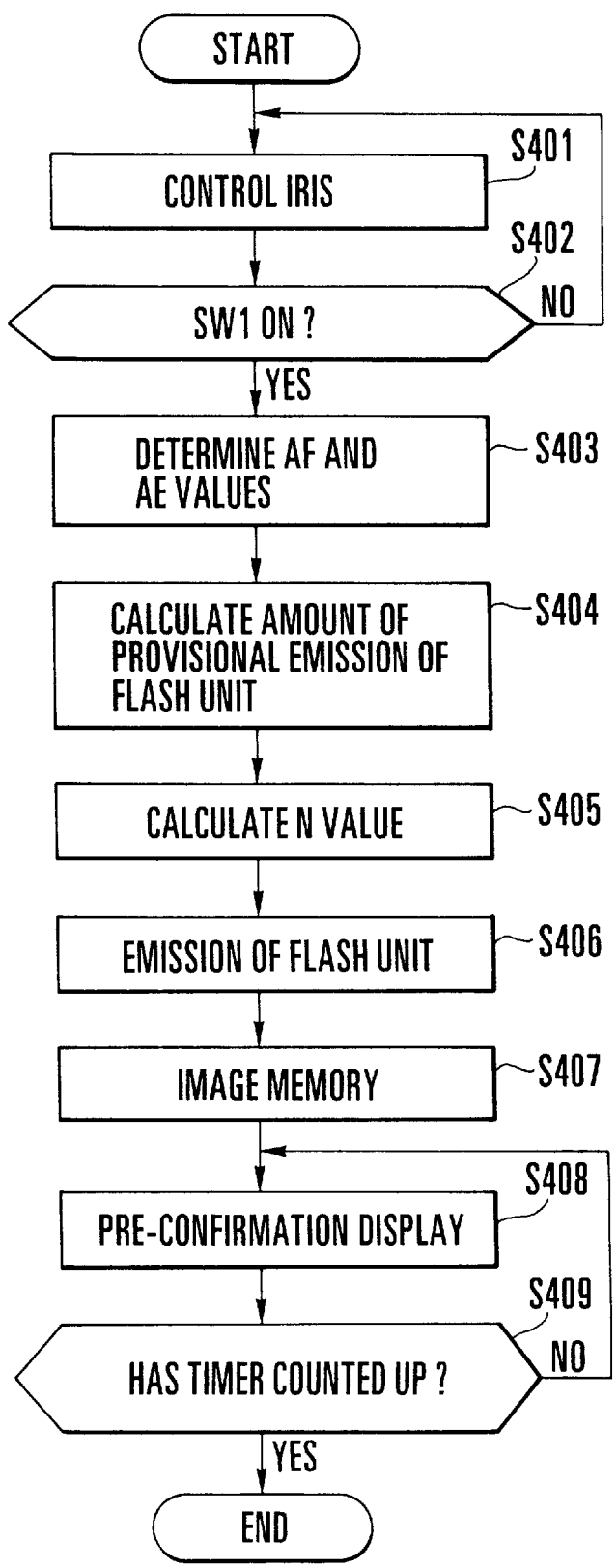
FIG. 17 is a flowchart of the fifth embodiment.

FIG. 16 is a timing chart showing the operation of executing a pre-confirmation accompanied by an emission of the flash unit 24, and FIG. 17 is a flowchart of the operation.

If an external luminance 201 becomes low when photography is to be performed, the video iris unit 11 of the reducing lens unit 10 is driven to keep constant the amount of light to be inputted to the solid-state image pickup element 13, so that the CCD output 205 is controlled to be kept constant (Iris Driving 202) (S401). At this time, if the photographer depresses the shutter button 35 to the first stroke position, the control means 101 generates a signal 203 indicative of the timing of the SW1 (S402).

When the signal 203 is inputted to the control means 101, the control means 101 stops the energization of the AF driving motor 110 to complete focusing, and also determines an AE value (S403). After that, the control means 101 generates an electrical trigger signal 204 and performs a flash emission for pre-confirmation. The control means 101 provisionally calculates the amount of correct flash emission which provides a correct amount of exposure of silver-halide film, from information indicative of the ISO sensitivity of film, information indicative of the distance measured by AF, the F-number of the lens unit 2 and the like (S404).

When exposure is performed on the basis of the amount of flash emission which is provisionally calculated from the state of the iris of the video iris unit 11 and information indicative of the ISO sensitivity of silver-halide film, the control means 101 calculates to what extent a video image exposure level 207 exceeds a correct exposure level.

The control means 101 sets the number of overexposure steps of the video image exposure level 207 to N, changes the amount of pre-emission of the flash unit 24 to a value equal to $\frac{1}{2}^N$ of the above provisional value, and causes the flash unit 24 to emit light (S405, S406).

If the amount of emission of the flash unit 24 is reduced in the above-described manner, the CCD output 205 and the video image exposure level 207 each of which contains the image information obtained at the timing of an emission are slightly higher than a correct exposure control value for the video camera part 102, but do not give rise to an extreme overexposure.

The control means 101 stores in the memory means 105 information for one field which contains the electrical trigger signal 204 for a video recording signal 206 (memory storage signal 408) (S407).

This information is displayed on the display means 106, such as the electronic viewfinder unit 18, for a predetermined time (S408, S409), so that the photographer can perform pre-confirmation of image information which is approximately equivalent to the state of exposure obtained when the flash unit 24 is made to emit light.

As is apparent from the foregoing description, in accordance with each of the above-described embodiments, a pre- or post-confirmation of photography which is accompanied by a flash emission and carried out by the still camera means can be readily and securely carried out through a still-image display obtained by storing and displaying an image provided by the video camera means. This image does not become a visually impaired image devoid of density and can also be readily confirmed, and a user can readily and securely carry out a pre- or post-confirmation of a content recorded by the still camera means. In addition, the recording carried out by the still camera means does not hinder the recording of moving-image information by the video camera means. Accordingly, it is possible to provide a video camera integrated with a still camera which is useful, easy to use and highly reliable.

In addition, one field of image information recorded by the video camera means, which does not include image information for one field which contains an emission of a flash part, is stored in the memory means and is displayed on the display means. Accordingly, a visually impaired image which is devoid of density owing to a flash emission is not displayed, and it is possible to readily and securely carry out a pre- or post-confirmation of a recording made by the still camera means.

In addition, the video camera means is controlled so that the exposure control value of the video camera means is made approximately equal to a correct exposure control value which allows the still camera means to achieve a correct exposure when the flash part emits light, and image information for one field which contains an emission of the flash part is displayed on the display means. Accordingly, it is possible to readily and securely carry out a pre- or post-confirmation of a photographic recording based on a correct exposure accompanied by a flash emission of the still camera means.

In addition, the flash part is made to emit light by the amount of emission smaller than the amount of emission which corresponds to a correct exposure control value of the still camera means, and image information for one field which contains an emission of the flash part is displayed on the display means so that occurrence of a visually impaired image devoid of density is prevented. It is possible to readily and securely carry out a pre-confirmation of a photographic recording accompanied by a flash emission of the still camera means.

In addition, if pre- and post-confirmations of a recording made by the still camera means are to be performed, the control means responds to the signal SW1 generated when the shutter button of the still camera means is depressed to the first stroke position and a signal of the X contact which is a trigger to cause an emission of the flash part, and executes control so that image information for one field indicative of an image photographed by the video camera means with a minimum time lag can be stored in the memory means and displayed on the display means.

In addition, in response to an input of the signal SW1 generated when the shutter button of the still camera means is depressed to the first stroke position, and in response to an input of the signal SW2 generated when the shutter button of the still camera means is depressed to the second stroke position, exposure control of the video camera means can be securely performed immediately before a pre- or post-confirmation is actually performed, so that the reliability of the exposure control can be improved.

What is claimed is:

1. A video camera capable of photographing a moving image and a still image through a common photographic optical lens system, comprising:

video image recording means for recording photographed moving-image information on a first recording medium;

still image recording means for recording photographed still-image information on a second recording medium;

display means for displaying, on a screen, a moving image corresponding to the moving-image information recorded by said video image recording means and a still image corresponding to the still-image information recorded by said still image recording means;

operating means for instructing photographing and recording operations; and control means for controlling said video image recording means, said still image recording means and said display means on the basis of operations of said operating means, said control means for causing said display means to display the moving image and not to display a still image on the screen in the case that said operating means is not operated, and to simultaneously display the moving image and the still image on the screen in response to a first operation of said operating means, and causing said still image recording means to record a still image corresponding to the still image displayed on the screen on the second recording medium in response to a second operation of said operating means and then to stop displaying the still image on the screen after a completion of the recording operation of the still image.

2. A movie/still camera capable of photographing a moving image and a still image through a common photographic optical lens system, comprising:

moving image recording means for recording photographed moving-image information on a first recording medium;

still image recording means for recording photographed still-image information on a second recording medium;

display means for displaying, on a screen, a moving image corresponding to the moving-image information recorded by said moving image recording means and a still image corresponding to the still-image information recorded by said still image recording means;

operating means for directing an instruction of photographing and recording operations;

control means for controlling said moving image recording means, said still image recording means and said display means on the basis of operations of said operating means, said control means for causing said display means to display the moving image and not to display a still image on the screen in the case that said operating means is not operated, and to simultaneously display the moving image in a portion in an image screen of said display means and the still image in another portion in said image screen of said display means in response to a first operation of said operating means, and causing said still image recording means to record a still image corresponding to the still image displayed on the screen on the second recording medium in response to a second operation of said operating means and then to stop displaying the still image on the screen after a completion of the recording operation of the still image.

3. A video camera integrated with a still camera, comprising:

video camera means for recording moving-image information on a first recording medium;

still camera means for recording still-image information on a second recording medium;

memory means for storing image information obtainable from said video camera means;

display means for displaying the image information;

control means for generating control timing and controlling each of said video camera means, said still camera means, said memory means and said display means; and operating means for allowing a user to perform photographing and recording operations, said still camera means having a flash part, and said operating means having a mode setting part for setting execution of a pre-confirmation to temporarily display an image immediately preceding an image to be recorded by said still camera means or execution of a post-confirmation to temporarily display an image recorded by said still camera means, when the pre-confirmation or the post-confirmation of a recording made by said still camera means which recording is accompanied by an emission of said flash part is to be performed, said control means executing control to store in said memory means image information for one field which is recorded by said video camera means and which does not include image information for one field which contains the emission of said flash part, and visually display the stored image information on said display means.

4. A video camera integrated with a still camera, comprising:

video camera means for recording moving-image information on a first recording medium;

still camera means for recording still-image information on a second recording medium;

memory means for storing image information obtainable from said video camera means;

display means for displaying the image information;

control means for generating control timing and controlling each of said video camera means, said still camera means, said memory means and said display means; and operating means for allowing a user to perform photographing and recording operations, said still camera means having a flash part, and said operating means having a mode setting part for setting execution of a pre-confirmation to temporarily display an image immediately preceding an image to be recorded by said still camera means or execution of a post-confirmation to temporarily display an image recorded by said still camera means, when the pre-confirmation or the post-confirmation of a recording made by said still camera means which recording is accompanied by an emission of said flash part is to be performed, said control means executing control to make an exposure control value of said video camera means approximately equal to a correct exposure control value which allows said still camera means to achieve a correct exposure when said flash part emits light, and executing control to store in said memory means image information for one field which contains the emission of said flash part, and visually display the stored image information on said display means.

5. A video camera integrated with a still camera, comprising:

video camera means for recording moving-image information on a first recording medium;

still camera means for recording still-image information on a second recording medium;

memory means for storing image information obtainable from said video camera means;

display means for displaying the image information;

control means for generating control timing and controlling each of said video camera means, said still camera means, said memory means and said display means; and operating means for allowing a user to perform photographing and recording operations, said still camera means having a flash part, and said operating means having a mode setting part for setting execution of a pre-confirmation to temporarily display an image immediately preceding an image to be recorded by said still camera means or execution of a post-confirmation to temporarily display an image recorded by said still camera means, when the pre-confirmation of a recording made by said still camera means which recording is accompanied by an emission of said flash part is to be performed, said control means executing control to cause said flash part to emit light by an amount of emission smaller than an amount of emission which corresponds to a correct exposure control value of said still camera means, store in said memory means image information for one field which contains the emission of said flash part, and visually display the stored image information on said display means.

6. A video camera integrated with a still camera according to claim 3, 4 or 5, wherein, when the pre-confirmation of the recording made by said still camera means is to be performed, said control means responds to a signal SWI generated when a shutter button of said still camera means is depressed to a first stroke position, and executes control to store in said memory means the image information for one field photographed by said video camera means and visually display the stored image information on said display means.

7. A video camera integrated with a still camera according to claim 3, 4 or 5, wherein, when the pre-confirmation of the recording made by said still camera means is to be performed, said control means responds to a signal of an X contact which is a trigger to cause an emission of said flash part of said still camera means, and executes control to store in said memory means the image information for one field to photographed by said video camera means and visually display the stored image information on said display means.

8. A video camera integrated with a still camera according to claim 5, wherein if the execution of the pre-confirmation of the recording made by said still camera means is set, said control means starts exposure control of said video camera means in response to an input of a signal SW1 generated when a shutter button of said still camera means is depressed to a first stroke position, whereas if the execution of the post-confirmation of the recording made by said still camera means is set, said control means starts exposure control of said video camera means in response to an input of a signal SW2 generated when the shutter button of said still camera means is depressed to a second stroke position.

9. A video camera according to claim 1, wherein said first recording medium is a magnetic tape.

10. A video camera according to claim 1, wherein said second recording medium is a film.

11. A video camera according to claim 1, wherein said operating means has a first stroke and a second stroke.

12. A video camera according to claim 11, wherein said first operation is depressed to said first stroke and second operation is depressed to said second stroke.

13. A video camera according to claim 1, wherein said still image recording means includes a flash part.

14. A video camera according to claim 13, wherein said flash part is not allowed to perform an emission of light while recording the moving image on the first recording medium.

15. A video camera according to claim 1, wherein said display means displays simultaneously combined a main-picture image with a sub-picture image on the screen.

16. A video camera according to claim 15, wherein said sub-picture image is formed substantially one-third of said main-picture image in height and width.

17. A movie/still camera according to claim 2, wherein said first recording medium is a magnetic tape.

18. A movie/still camera according to claim 2, wherein said second recording medium is a film.

19. A movie/still camera according to claim 2, wherein said operating means has a first stroke and a second stroke.

20. A movie/still camera according to claim 19, wherein said first operation is depressed to said first stroke and said second operation is depressed to said second stroke.

21. A movie/still camera according to claim 2, wherein said still image recording means includes a flash part.

22. A movie/still camera according to claim 2, wherein said flash part is not allowed to perform an emission of light while recording the moving image on the first medium.

23. A movie/still camera according to claim 2, wherein said display means displays simultaneously combined a main-picture image with a sub-picture image on the screen.

24. A movie/still camera according to claim 23, wherein said sub-picture image is formed substantially one-third of the main-picture image in height and width.

* * * * *

UNITED STATES PATENT AND TRADEMARK OFFICE
CERTIFICATE OF CORRECTION

PATENT NO. : 6,359,649 B1
DATED : March 19, 2002
INVENTOR(S) : Etsurou Suzuki

It is certified that error appears in the above-identified patent and that said Letters Patent is hereby corrected as shown below:

Column 9,
Line 19, delete "the. following" and insert -- the following --.

Column 15,
Line 24, delete "emit s" and insert -- emits --.

Column 17,
Line 12, delete "Sw2" and insert -- SW2 --.

Column 24,
Line 34, delete "claim 5" and insert -- claim 4 --.

Signed and Sealed this

Fifth Day of November, 2002

*Attest:*

JAMES E. ROGAN
*Attesting Officer*   *Director of the United States Patent and Trademark Office*